United States Patent
Chowdhury et al.

(10) Patent No.: US 9,860,024 B2
(45) Date of Patent: Jan. 2, 2018

(54) TRANSMISSION CONTROL PROTOCOL IN LONG TERM EVOLUTION RADIO ACCESS NETWORK

(71) Applicant: Altiostar Networks, Inc., Tewksbury, MA (US)

(72) Inventors: Kuntal Chowdhury, Andover, MA (US); Ashraf M. Dahod, Andover, MA (US); Anupam Kumar Goel, Bangalore (IN); Si Nguyen, Winchester, MA (US); Manish Mittal, Andover, MA (US); Pramod Kumar Singh, Uttar Pradesh (IN)

(73) Assignee: ALTIOSTAR NETWORKS, INC., Tewksbury, MA (US)

( * ) Notice: Subject to any disclaimer, the term of this patent is extended or adjusted under 35 U.S.C. 154(b) by 554 days.

(21) Appl. No.: 14/225,031

(22) Filed: Mar. 25, 2014

(65) Prior Publication Data

US 2014/0286258 A1 Sep. 25, 2014

Related U.S. Application Data

(60) Provisional application No. 61/804,991, filed on Mar. 25, 2013, provisional application No. 61/804,893, (Continued)

(51) Int. Cl.
*H04L 1/18* (2006.01)
*H04L 29/06* (2006.01)
(Continued)

(52) U.S. Cl.
CPC ............ *H04L 1/1812* (2013.01); *H04L 1/188* (2013.01); *H04L 1/1854* (2013.01);
(Continued)

(58) Field of Classification Search
None
See application file for complete search history.

(56) References Cited

U.S. PATENT DOCUMENTS 5,983,278 A * 11/1999 Chong ................ H04L 12/5602
370/414
8,531,947 B2 9/2013 Zhao et al.
(Continued)

FOREIGN PATENT DOCUMENTS

EP 2 200 390 A2 6/2010
EP 2 501 141 A2 9/2012
(Continued)

OTHER PUBLICATIONS

Balakrishnan H et al: "Improving Reliable Transport and Han Doff Performance in Cellular Wireless Networks", Wireless Networks, ACM, 2 Penn Plaza, Suite 701—New York USA, vol. 1, No. 4, Dec. 1, 1995 (Dec. 1, 1995), pp. 469-481 (hereinafter Balakrishnan).*
(Continued)

*Primary Examiner* — Eunsook Choi
(74) *Attorney, Agent, or Firm* — Mintz Levin Cohn Ferris Glovsky and Popeo, P.C.

(57) ABSTRACT

A system, a method, a device, and a computer program product for transmission of data packets between a user device and a server. A communication link between the user device and the server is established in accordance with a transmission control protocol for transmission of a data packet between the user device and the server. The data packet is transmitted utilizing the transmission control protocol.

45 Claims, 18 Drawing Sheets

Related U.S. Application Data filed on Mar. 25, 2013, provisional application No. 61/804,920, filed on Mar. 25, 2013, provisional application No. 61/804,932, filed on Mar. 25, 2013.

(51) Int. Cl.
| | | |
|---|---|---|
| *H04W 80/06* | (2009.01) | |
| *H04W 28/02* | (2009.01) | |
| *H04L 12/801* | (2013.01) | |
| *H04L 12/893* | (2013.01) | |
| *H04W 76/02* | (2009.01) | |

(52) U.S. Cl.
CPC .......... *H04L 1/1887* (2013.01); *H04L 47/193* (2013.01); *H04L 47/40* (2013.01); *H04L 69/16* (2013.01); *H04L 69/163* (2013.01); *H04W 28/0273* (2013.01); *H04W 80/06* (2013.01)

(56) References Cited

U.S. PATENT DOCUMENTS

| | | | |
|---|---|---|---|
| 2002/0172178 A1* | 11/2002 | Suzuki | H04W 76/068 370/338 |
| 2002/0196778 A1* | 12/2002 | Colmant | H04L 12/5601 370/352 |
| 2003/0235171 A1 | 12/2003 | Lundstrom et al. | |
| 2009/0201813 A1* | 8/2009 | Speight | H04W 80/06 370/235 |
| 2009/0252148 A1 | 10/2009 | Dolganow et al. | |
| 2010/0054231 A1 | 3/2010 | Dolganow et al. | |
| 2010/0062781 A1 | 3/2010 | Dolganow et al. | |
| 2010/0067489 A1 | 3/2010 | Pelletier et al. | |
| 2011/0242975 A1 | 10/2011 | Zhao et al. | |
| 2011/0267951 A1 | 11/2011 | Stanwood et al. | |
| 2012/0163298 A1 | 6/2012 | Zhou et al. | |
| 2012/0257581 A1 | 10/2012 | De | |
| 2012/0300710 A1* | 11/2012 | Li | H04W 88/085 370/329 |
| 2012/0300747 A1 | 11/2012 | Westberg et al. | |
| 2013/0051329 A1 | 2/2013 | Take | |
| 2013/0272181 A1 | 10/2013 | Fong et al. | |
| 2014/0226481 A1 | 8/2014 | Dahod et al. | |
| 2014/0233413 A1 | 8/2014 | Dahod et al. | |
| 2014/0233459 A1 | 8/2014 | Dahod et al. | |
| 2014/0233479 A1 | 8/2014 | Dahod et al. | |
| 2014/0258365 A1* | 9/2014 | L'Heureux | H04L 67/101 709/203 |
| 2014/0304425 A1* | 10/2014 | Taneja | H04L 47/12 709/235 |

FOREIGN PATENT DOCUMENTS

| | | |
|---|---|---|
| EP | 2 530 988 A1 | 12/2012 |
| WO | WO-2011/080714 A2 | 7/2011 |
| WO | WO-2012/084636 A1 | 6/2012 |
| WO | WO-2012/139016 A2 | 10/2012 |
| WO | WO-2012/139664 A1 | 10/2012 |
| WO | WO-2012/177763 A2 | 12/2012 |
| WO | WO-2013/038167 A2 | 3/2013 |
| WO | WO-2014/127054 A1 | 8/2014 |
| WO | WO-2014/130708 A1 | 8/2014 |
| WO | WO-2014/130709 A1 | 8/2014 |
| WO | WO-2014/130713 A1 | 8/2014 |
| WO | WO-2014/160709 A2 | 10/2014 |
| WO | WO-2014/160718 A1 | 10/2014 |
| WO | WO-2014/160722 A1 | 10/2014 |

OTHER PUBLICATIONS

Balakrishnan, et al., (1995); "Improving Reliable Transport and Handoff Performance in Cellular Wireless Networks", Wireless Networks, ACM, 1:469-481.

Border et al., (2001); "Performance Enhancing Proxies Intended to Mitigate Link-Related Degradations", Network Working Group Request for Comments: 3135; pp. 1-45.

Du, et al., (2009); "Downlink Scheduling for Multimedia Multicast/Broadcast over Mobile WiMAX: Connection-Oriented Multistate Adaptation", IEEE Wireless Communications, pp. 72-79.

Yoon, et al., (2012); "MuVi", Mobile Computing and Networking, ACM, pp. 209-220.

International Search Report for PCT/US2014/016123, dated Jul. 22, 2014.

International Search Report for PCT/US2014/017456, dated Jul. 3, 2014.

International Search Report for PCT/US2014/017459, dated Jul. 3, 2014.

International Search Report for PCT/US2014/017464, dated Jun. 16, 2014.

International Search Report for PCT/US2014/031749, dated Aug. 5, 2014.

International Search Report for PCT/US2014/031725, dated Oct. 7, 2014.

International Search Report for PCT/US2014/031744, dated Sep. 4, 2014.

International Search Report for PCT/US2014/031753, dated Aug. 14, 2014.

\* cited by examiner

TRANSMISSION CONTROL PROTOCOL IN LONG TERM EVOLUTION RADIO ACCESS NETWORK

CROSS-REFERENCE TO RELATED APPLICATIONS

The present application claims priority to U.S. Provisional Patent Application No. 61/804,893, filed Mar. 25, 2013, and entitled "Transmission Control Protocol Proxy In Evolved Node B", U.S. Provisional Patent Application No. 61/804,920, filed Mar. 25, 2013, and entitled "Transmission Control Protocol Redundancy Elimination In A Mobile Communication Network", U.S. Provisional Patent Application No. 61/804,932, filed Mar. 25, 2013, and entitled "Transmission Control Protocol State Aware Scheduler In Evolved Node B", and U.S. Provisional Patent Application No. 61/804,991, filed Mar. 25, 2013, and entitled "Transmission Control Protocol Proxy To Improve Battery Life Of User Equipment In A Mobile Communication Network," and incorporates their disclosures herein by reference in their entireties.

TECHNICAL FIELD

The subject matter described herein generally relates to data processing and in particular, to transmission control protocol in a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications links typically connect endpoint devices (e.g., mobile telephones, personal computers, servers, etc.) so that devices can transmit data to one another. Data transmissions are typically governed by various protocols that are specified in the Internet protocol suite, which includes the networking model and a set of communications protocols used for the Internet and/or similar networks. The Internet protocol suite is typically referred to as TCP/IP and contains its most important protocols: the Transmission Control Protocol ("TCP") and the Internet Protocol ("IP"). The TCP/IP model and protocols are maintained by the Internet Engineering Task Force ("IETF"). TCP/IP provides end-to-end connectivity specifying how data should be formatted, addressed, transmitted, routed and received at the destination endpoint device. TCP/IP protocols are organized into the following four abstraction layers (from lowest to highest): the link layer (containing communication technologies for a single network segment (link)), the internet layer (connecting independent networks to establish internetworking), the transport layer (handling process-to-process communication), and the application layer (providing interfaces to the user and support services).

In view of large amounts of data that are typically transmitted to and/from endpoint devices in existing wireless communications systems, such systems and/or associated endpoint devices are affected by various problems, such as data loss, congestion, redundant transmissions, battery power loss (e.g., in user equipment), and others. Thus, there is a need to provide a wireless communication system that is capable of providing an efficient, cost-effective and reliable transmission of data between endpoint devices using TCP.

SUMMARY

In some implementations, the current subject matter relates to a computer-implemented method for transmission of data packets between a user device and a server, according to some implementations of the current subject matter. The method can be performed using a base station (e.g., an evolved Node B base station). A communication link can be established between the user device and the server in accordance with a transmission control protocol for transmission of a data packet between the user device and the server. The data packet can be transmitted utilizing the transmission control protocol. At least one of the establishing and the transmitting can be performed using at least one processor of at least one computing system.

In some implementations, the current subject matter can include one or more of the following optional features. An evolved node (eNodeB) base station can perform operations of the method, where the eNodeB base station can include the at least one processor and the at least one memory.

In some implementations, the method can further include storing, using the at least one memory of the base station, data packets received from the server, the stored data packets include at least one transmission control protocol (TCP) data packet. The method can further include transmitting, using the at least one processor of the base station, at least one data packet stored in the at least one memory from the base station to the user device. The method can also include re-transmitting, using the at least one processor of the base station, at least one data packet stored in the at least one memory from the base station to the user device. In some implementations, the method can include receiving, using the at least one processor of the base station, at least one acknowledgement from the user device indicating that the at least one data packet is received by the user device. In some implementations, the method can also include receiving, using the at least one processor of the base station, at least one duplicate acknowledgement from the user device indicating that the at least one data packet is received by the user device, and re-transmitting, after receiving a predetermined number of duplicate acknowledgements from the user device, using the at least one processor of the base station, the at least one data packet stored in the at least one memory to the user device.

In some implementations, the method can also include receiving, using the at least one processor of the base station, at least one non-acknowledgement from the lower layer of the eNodeB indicating that the at least one data packet has not been received by the user device, re-transmitting, after receiving the non-acknowledgement from the lower layer of the eNodeB, using the at least one processor, the at least one data packet stored in the at least one memory to the user device. The non-acknowledgement can be generated by at least one of the following: a packet data convergence protocol (PDCP) layer of the eNodeB, a media access control (MAC) layer of the eNodeB, and a radio link control (RLC) layer of the eNodeB.

In some implementations, the method can include determining, using the at least one processor of the base station, a round trip time information for the at least one data packet, the round trip time information includes time taken by a transmission of the at least one data packet to the user device and a transmission of an acknowledgement by the user device indicative of the receipt of the data packet; and re-transmitting, based on the determined round trip time, using the at least one processor of the base station, the at least one data packet stored in the at least one memory to the user device.

In some implementations, the method can also include re-transmitting, using the at least one processor of the base station, the at least one data packet stored in the at least one memory to the user device using high priority indication.

In some implementations, at least one processor of the base station can prevent re-transmission of the data packet from the server to the user device upon the server failing to receive an acknowledgement from the user device within a predetermined period of time. The base station's processor can send to the server the acknowledgement indicating receipt of the data packet by the user device upon the processor sending a hybrid automatic repeat request (HARQ) data packet to the user device, and receiving, in response to the sending, a confirmation from the user device that the data packet was received by the user device.

In some implementations, the base station's processor can send to the server an acknowledgement indicating a receipt of the data packet by the user device upon receiving a confirmation that the data packet was received by the user device, the confirmation being generated by at least one of the following: a media access control (MAC) layer of the eNodeB, a packet data convergence protocol (PDCP) layer of the eNodeB, and a radio link control (RLC) layer of the eNodeB.

In some implementations, the base station's processor can schedule transmission of the data packet from the server to the user device using the transmission control protocol. The base station's processor can perform congestion avoidance on the communication link during transmission of the data packet using transmission control protocol.

In some implementations, the base station's processor can determine a total size of data packets that can be received by the base station, and provide an indication of the determined total size to the server. The total size of data packets can be determined based on at least one of the following: a storage threshold of the at least one memory, a current capacity of the at least one memory based on existing data stored in the at least one memory, a strength of a radio signal existing between the user device and the eNodeB base station, a quality of a radio signal existing between the user device and the eNodeB base station, an estimated bit rate of data traversing between the user device and the eNodeB based on the at least one buffer status report from at least one of the following: a media access control (MAC) layer of the eNodeB, a packet data convergence protocol (PDCP) layer of the eNodeB, and a radio link control (RLC) layer of the eNodeB, and an ability of the user device to receive data packets having a predetermined size.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide a long term evolution radio access network having intelligent capabilities, including transmission of data using TCP.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
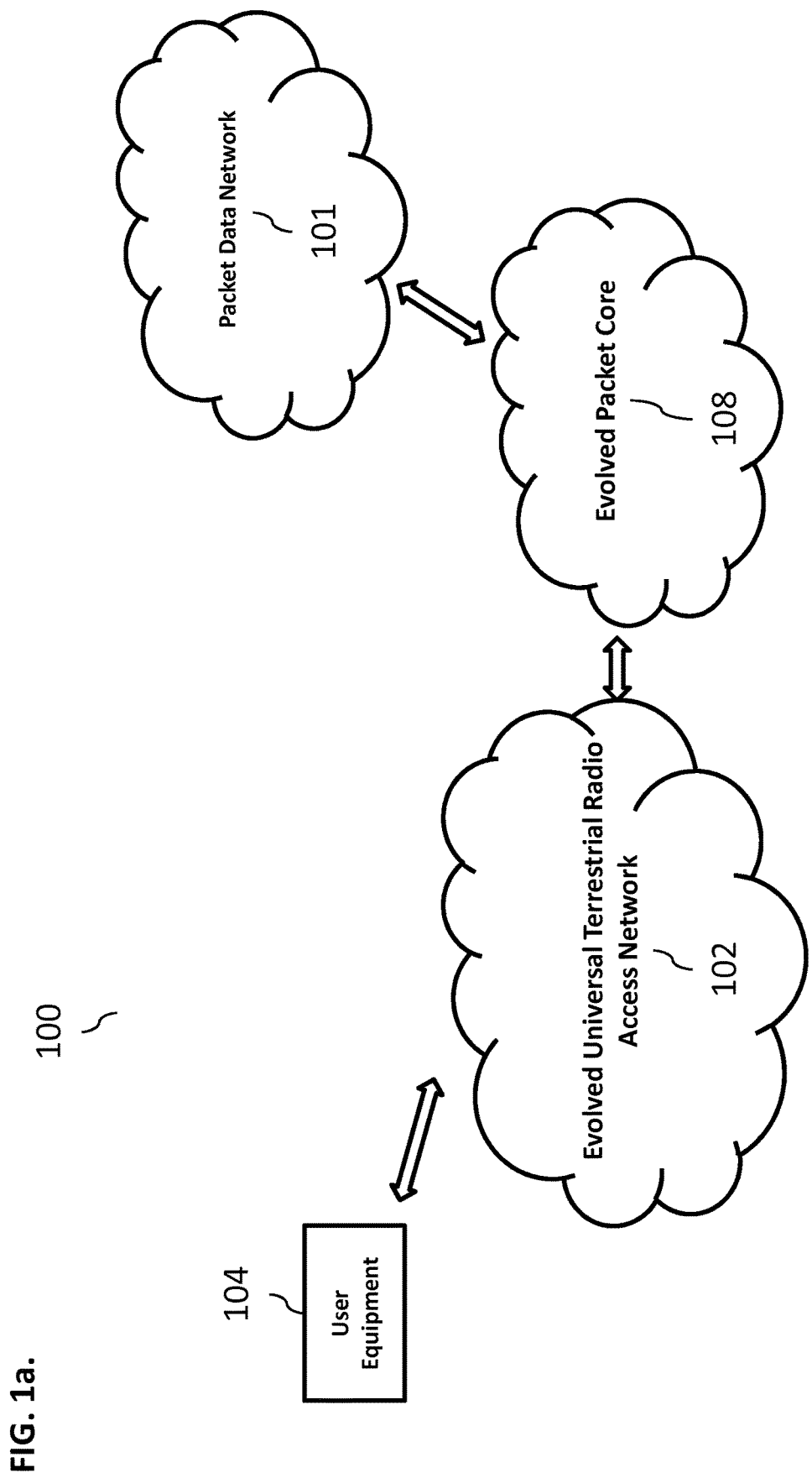
FIG. 1a illustrates an exemplary conventional long term evolution ("LTE") communications system.
Figure 1B:
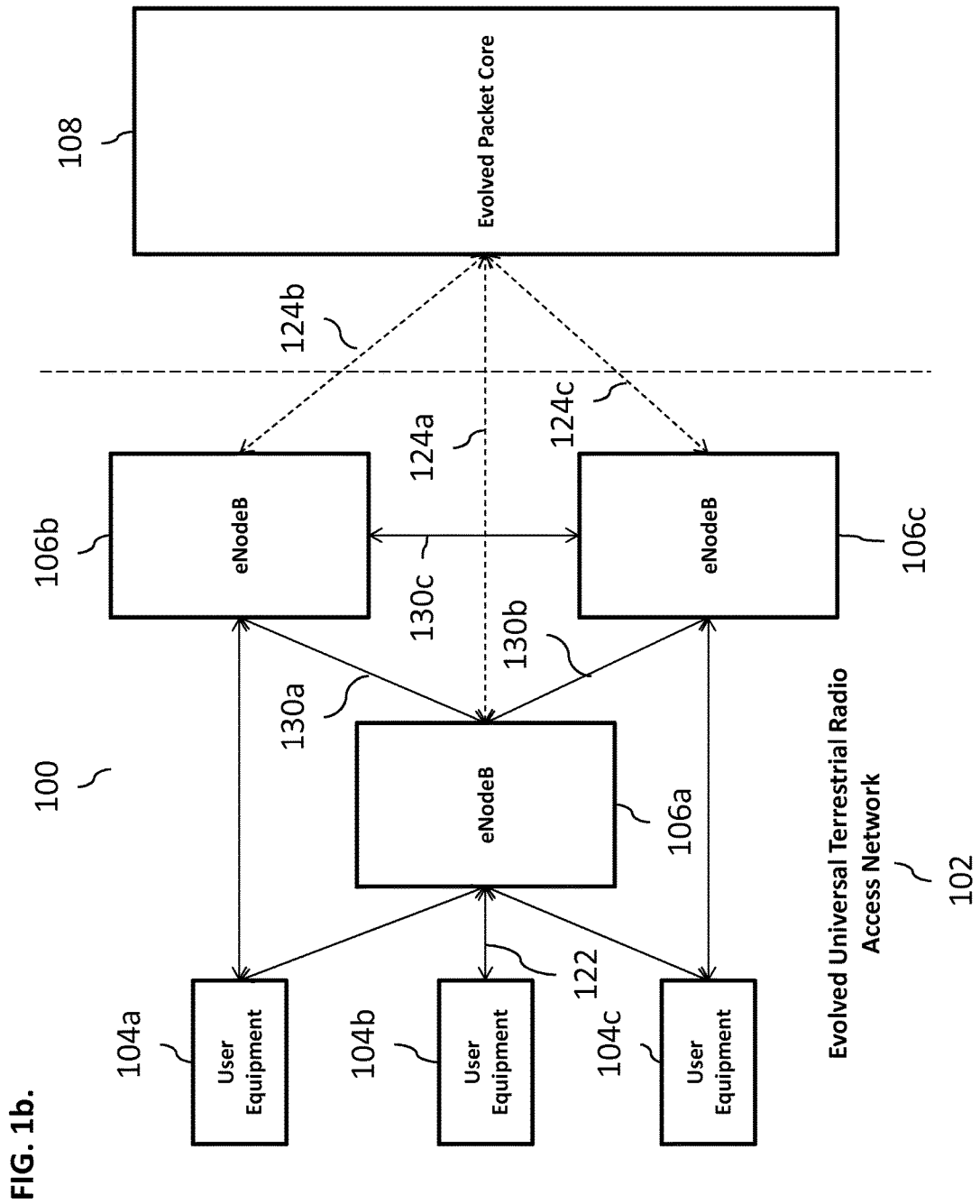

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
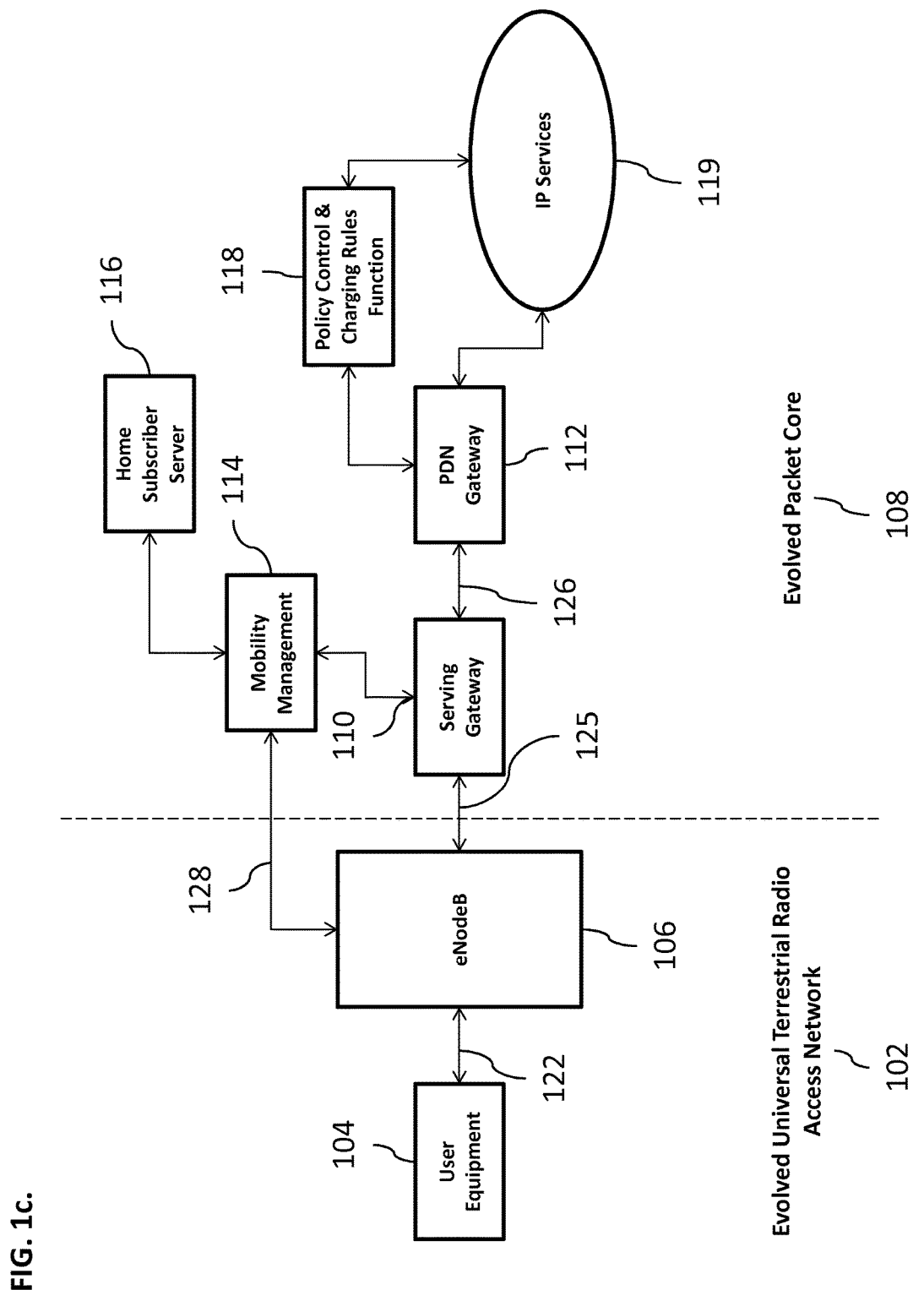

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decisionmaking, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

II. eNodeB

Figure 1D:
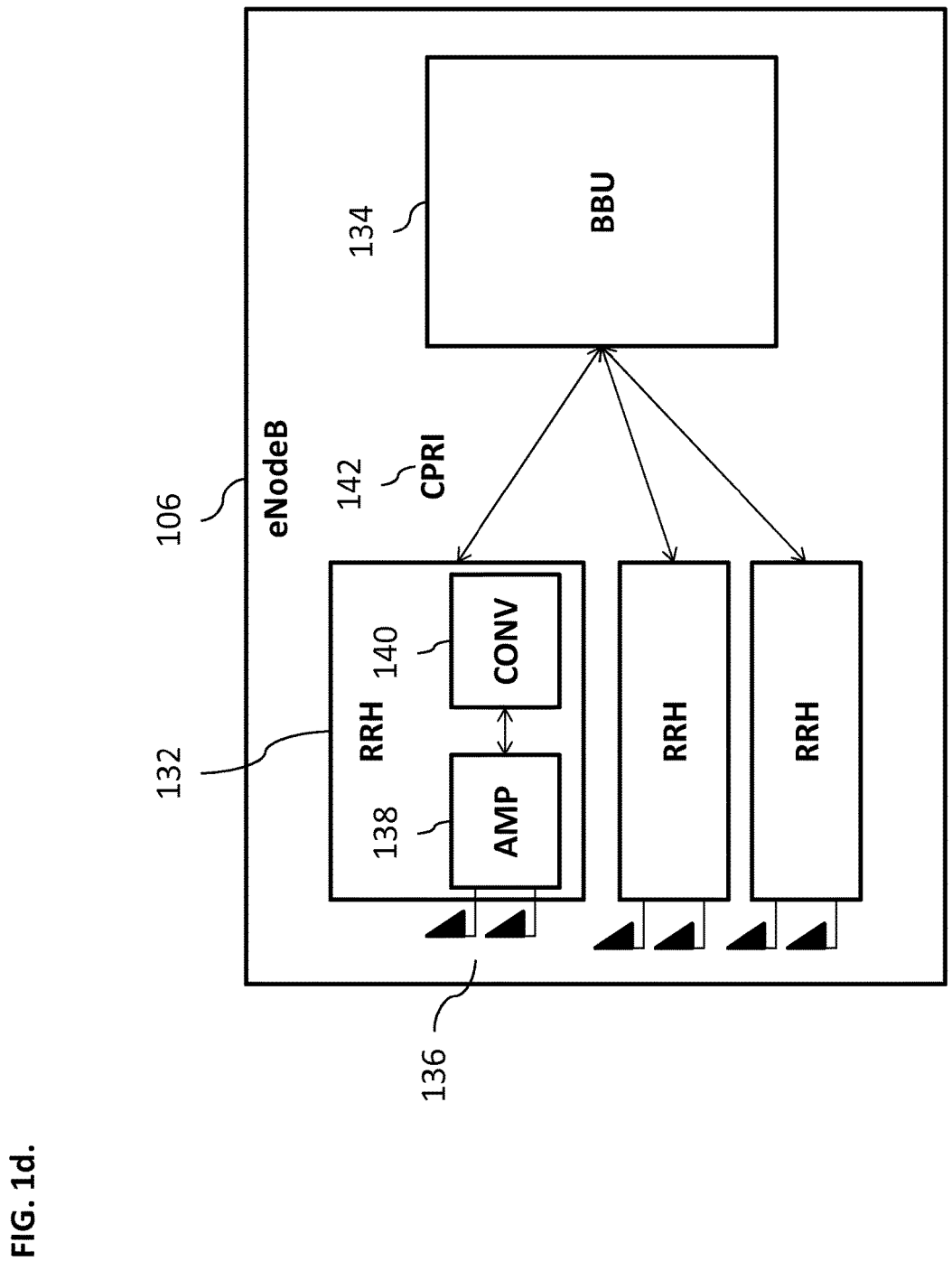

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
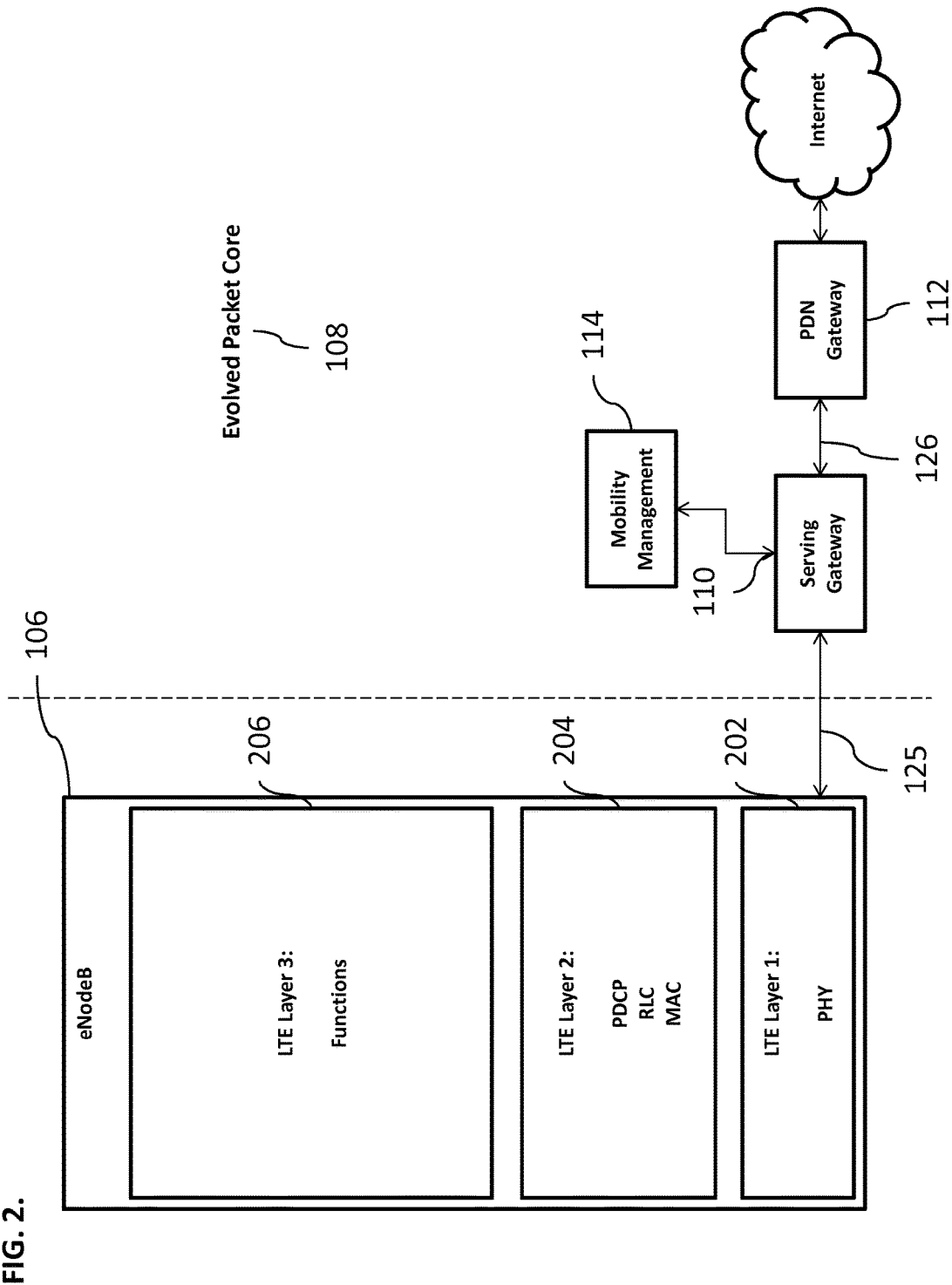
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
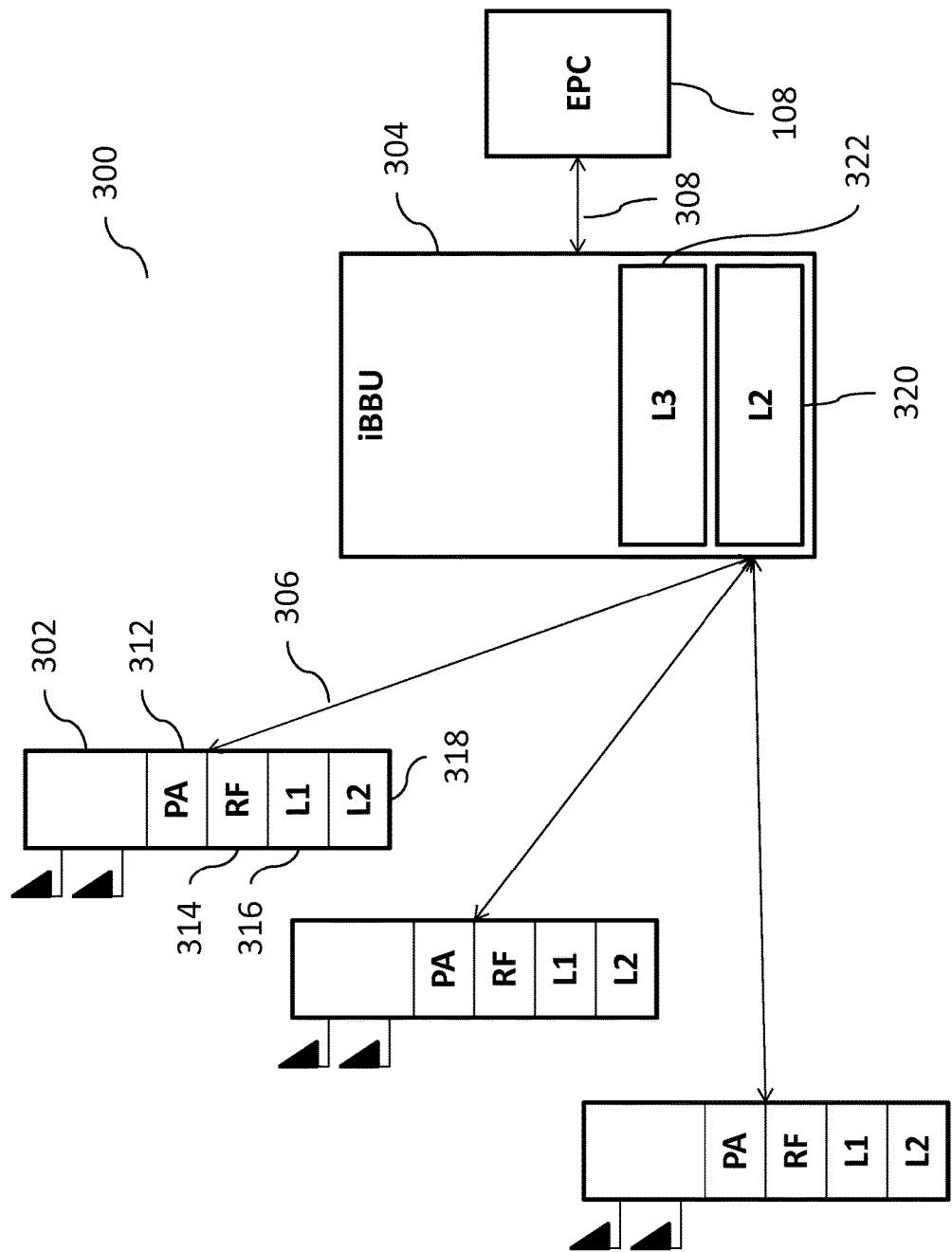
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

IV. TCP in Intelligent LTE Radio Access Network

In some implementations, the current subject matter system can be configured to implement and/or otherwise use transmission control protocol ("TCP") for the purposes of data transmissions between a user equipment and a server via an eNodeB. The eNodeB can be configured to handle TCP transmissions and can include a TCP processor that can act as a component for managing such data transmissions.

TCP is considered as one of the core protocols of the Internet protocol suite ("IP") and provides reliable, ordered, error-checked delivery of a stream of octets between programs running on devices that can be connected to a network (e.g., a local area network, intranet or the public Internet. TCP resides in the transport layer. TCP accepts data from a data stream, divides it into chunks, and adds a TCP header, which creates a TCP segment. The TCP segment is then encapsulated into an IP datagram and exchanged with peer devices.

A TCP segment includes a TCP header and a data section. The TCP header contains ten mandatory fields and an optional extension field. The data section follows the header and includes payload data carried for an application. The length of the data section is calculated by subtracting the combined length of the TCP header and the encapsulating IP header from the total IP datagram length (as specified in the IP header). Web browsers or other applications use TCP, when they connect to servers on the World Wide Web, to deliver payload data (e.g., email, files, etc.) and/or transfer files from one location to another.

TCP protocol operations include three phases: connection establishment, data transfer, and connection termination. Connection establishment involves a multi-step handshake process which is followed by the data transfer phase. After data transmission is completed, the connection termination phase closes established virtual circuits and releases all allocated resources. TCP connections are managed by an operating system through a programming interface that represents an endpoint for communications, i.e., an Internet socket.

To establish a connection, TCP uses a three-way handshake. However, before a client (e.g., a software application, an endpoint device (e.g., a personal computer, a wireless device, a server, etc.)) can connect to a server, the server performs a passive open procedure (i.e., binding to and listening at a port to open it up for connections). Once established, the client application initiates an active open. During the active open, the three-way handshake includes: sending a SYN packet from the client to the server, where the client sets the segment's sequence number to a random value; sending a SYN-ACK packet from the server in reply, where the packet includes an acknowledgment number that is set to one more than the received sequence number and a sequence number chosen by the server for the packet, where the sequence number is another random number; and sending an ACK packet from the client back to the server. In the ACK packet, the sequence number is set to the received acknowledgement value and the acknowledgement number is set to one more than the received sequence number.

To terminate a connection, a four-way handshake is used, where each side (client and server) terminates connection independently. When an endpoint device wishes to stop its half of the connection, it transmits a FIN packet, where the other endpoint device acknowledges with an ACK packet. Thus, connection termination typically includes a pair of FIN and ACK packets from each TCP endpoint device.

Transmission of data using TCP can occur between devices in wired and/or wireless communications networks. To allow use of the TCP for data transmission purposes between user equipment in a wireless network (such as networks discussed in connection with FIGS. 1*a*-3 above) and servers, a TCP processor can be included in the eNodeB.

Figure 4:
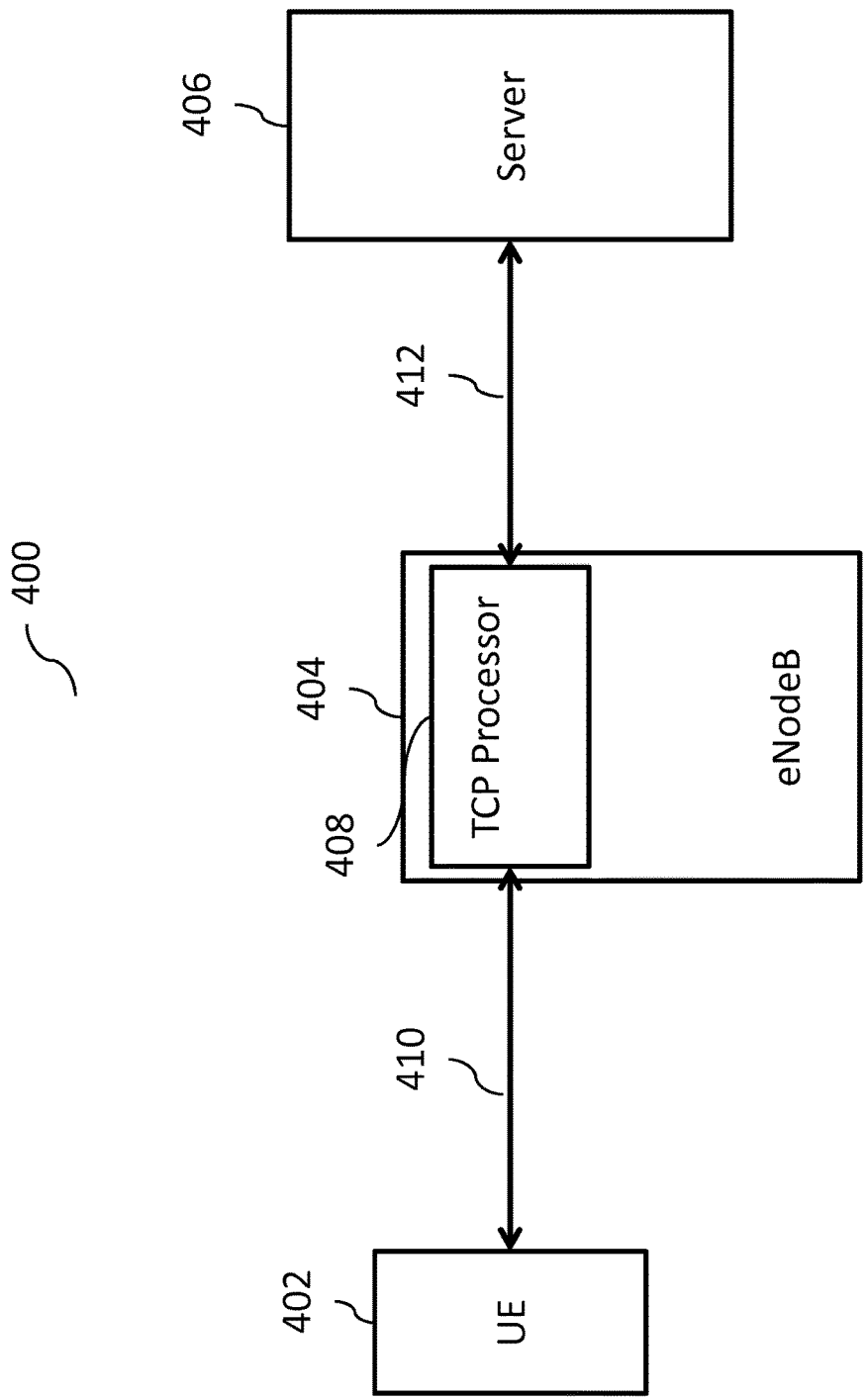
FIG. 4 illustrates an exemplary communications system that includes a transmission control protocol ("TCP") functionality in a base station, according to some implementations of the current subject matter.

FIG. 4 illustrates an exemplary system 400 having a TCP processor 408 in an eNodeB, according to some implementations of the current subject matter. The system 400 can include an eNodeB 404 and/or any other type of base station communicatively coupled with a user equipment 402 via an over-the-air link 410 and with a server 406 via link 412. The server 406 can be part of the core network (not shown in FIG. 4) and/or can be a server outside of the core network. The server can include and/or obtain data that is desired by the user equipment 402. The user equipment 402 can communicate with the eNodeB 404, as discussed above in connection with FIGS. 1*a*-3. The eNodeB 404 can include the structure shown in FIG. 3 and discussed above.

In some implementations, the TCP processor 408 can be a software module and/or any combination of hardware and/or software components that can be disposed in a base station (e.g., eNodeB 404). These components can be separate from other components of the base station and/or share components with other hardware and/or software disposed in the base station.

To establish connection between the user equipment 402 and the server 406, the user equipment 402 can establish connection with the TCP processor 408, which can also establish connection with the server 406. The TCP processor 408 can transmit data received from the user equipment 402 to the server 406 as well as transmit data received from the server 406 to the user equipment 402.

In TCP transmissions, throughput of a communication can be limited by two windows: a congestion window ("CNWD") and a receive window ("RW"). CNWD determines the number of bytes that can be outstanding at any time during a TCP transmission. This is different from TCP window size maintained by the receiver of data. CNWD prevents a link between two endpoints of the connection from getting overloaded with too much data traffic. The size of CNWD is calculated by estimating how much congestion there is between the two endpoints. The sender of data typically maintains CNWD. When a connection is set up, CNWD (a value maintained independently at each host) is set to a small multiple of the maximum segment size ("MSS") allowed on the connection. Further variance in the congestion window is determined by the known additive increase/multiplicative decrease ("AIMD") approach (i.e., a feedback control algorithm used in TCP congestion avoidance, which increases transmission rate (window size) until data loss occurs and/or increases CNWD by a fixed amount every round trip time. When congestion is detected, the transmitter decreases the transmission rate by a multiplicative factor (e.g., cut the congestion window in half after data loss)). If all segments are received and the acknowledgments reach the sender on time, a constant value is added to the window size. The window grows exponentially until a timeout occurs or the receiver reaches its limit (a threshold value "ssthresh"). After this, CNWD increases linearly at the rate of 1/(congestion window) packets on each new acknowledgement received. When timeout occurs, the following occurs: congestion window is reset to 1 MSS, "ssthresh" is set to half the window size before packet loss started, and "slow start" is initiated. A system administrator can adjust the maximum window size limit and/or adjust the constant added during additive increase, as part of TCP tuning. The flow of data over a TCP connection is also controlled by RW, which is provided by the receiver of data. The sender determines how much data it can send by comparing its own CNWD with RW.

To avoid congestion, CNWD should not exceed capacity of the network on which the data is transmitted. To control flow of data, RW should not exceed capacity of receiver equipment to process data. The receiver equipment can be overwhelmed by data if the receiver (e.g., a Web server) is very busy. Typically, each TCP segment can contain a current value of RW. If a sender receives an ACK, acknowledging byte 1000 and specifying RW size of 5000 bytes, the sender will not send data packets after byte 6000, even if the CNWD allows it.

TCP splicing or delayed binding typically refers to a postponement of a connection between two endpoints in order to obtain sufficient information about the connection and/or endpoints to make an appropriate routing decision. Some endpoint devices (e.g., application switches, routers, etc.) can delay binding of a client session (e.g., user equipment) to a server until proper handshakes are completed.

A. Local TCP Segment Buffering and Retransmission

Figure 5:
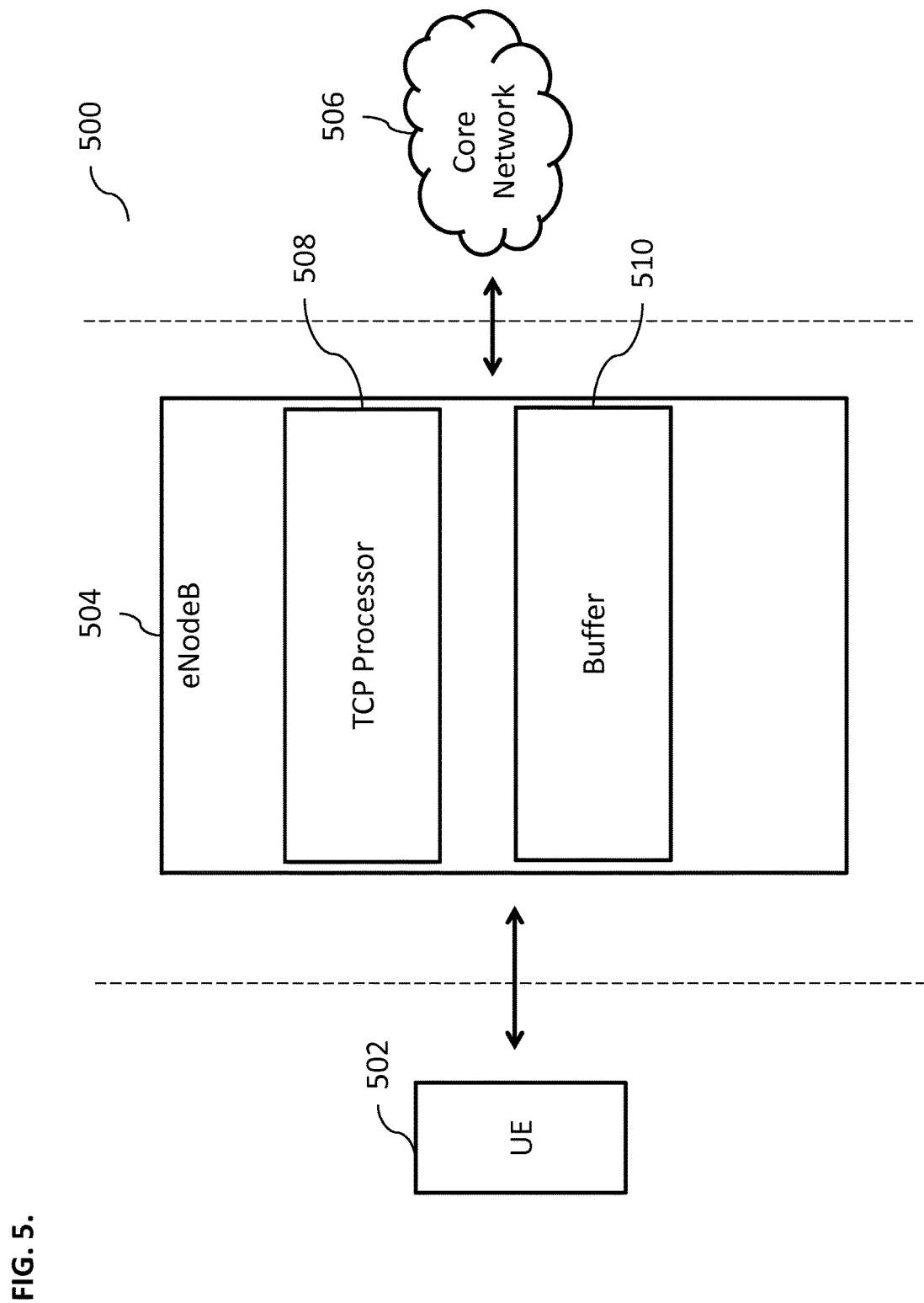
FIG. 5 illustrates an exemplary system which includes buffering and retransmission functionalities, according to some implementations of the current subject matter.

FIG. 5 illustrates an exemplary system 500 that can include TCP processing capabilities outlined above, according to some implementations of the current subject matter. The system 500 can include an intelligent eNodeB 504 (such as an iBBU 304 shown in FIG. 3) communicating with a user equipment 502 and a core network 506. The user equipment 502 can receive and/or transmit various data from and/or to a server and/or any other endpoint device (not shown in FIG. 5) using TCP, where the server can be part of the core network 506 and/or can be separate from, but connected to, the core network 506. The eNodeB 504 can also include a TCP processor 508 that can provide the above TCP processing capabilities, including but not limited to establishing and/or managing connection(s) between user equipment 502 and server/endpoint device. The eNodeB 504 can also include a buffer 510 that can be used for buffering and/or storing TCP segments and/or ACKs. The TCP processor 508 and/or the buffer 510 can be software modules and/or a combination of software and/or hardware components of eNodeB 504. The buffer 510 can also be any type of storage hardware and/or software.

Figure 6:
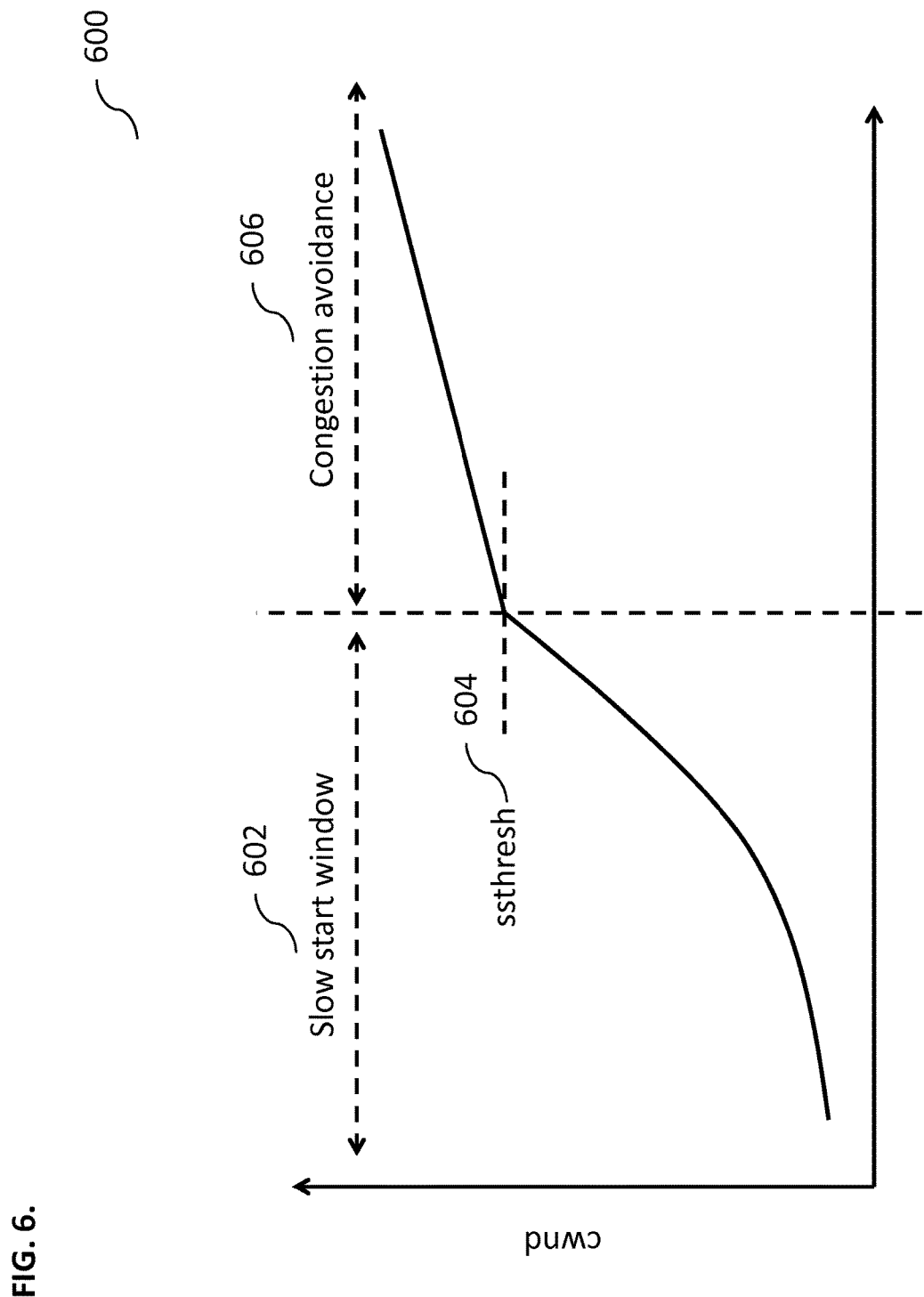
FIG. 6 illustrates an exemplary congestion window control in TCP communications.

In some implementations, the TCP processor 508 can implement control of initial window ("IW"), RW, and CNWD and/or perform other TCP-related functions to avoid congestion of a connection and thus, a loss of data packets. As shown in FIG. 6, in the slow start window 602 and prior to reaching the "ssthresh" threshold value 604, the TCP processor 608 can perform assignment of priority to data packets. Additionally, during the slow start window 602, the TCP processor 508 can perform an aggressive scheduling of data packets for transmission in the event that there exists a good radio frequency signal between the user equipment 502 and the eNodeB 504. Conversely, if a poor radio frequency is detected between the user equipment 502 and the eNodeB 504, the TCP processor 508, during the slow start window 602, can conservatively schedule data packets for transmission. This way congestion of the connection, multiple retransmissions and/or loss of data can be avoided.

Further, during the slow start window, the congestion window size can double in size with each round trip that the packet takes, i.e., each time an acknowledgement is received by the server that the packet has been successfully transmitted to and received by the endpoint device, the size of congestion window can increase (depending on the TCP implementation, the size of the congestion window can increase accordingly). Thus, the increase in size of the congestion window can be exponential. Once the congestion avoidance phase is reached, the size of the congestion window can only be increased linearly, as indicated by the straight line in congestion avoidance phase 606 in FIG. 6.

TCP performance can be severely penalized when the server detects packet loss. In some TCP implementations, during TCP transmission session, if the server receives duplicate acknowledgements (e.g., three duplicate acknowledgement ("DUP ACKs")), the server can determine that a particular TCP packet has not been received by the endpoint device and ascertain that there is congestion, which will cause the server to reset the congestion window and reduce the "ssthresh" value (e.g., by one half). This situation is illustrated in FIG. 7.

Figure 7:
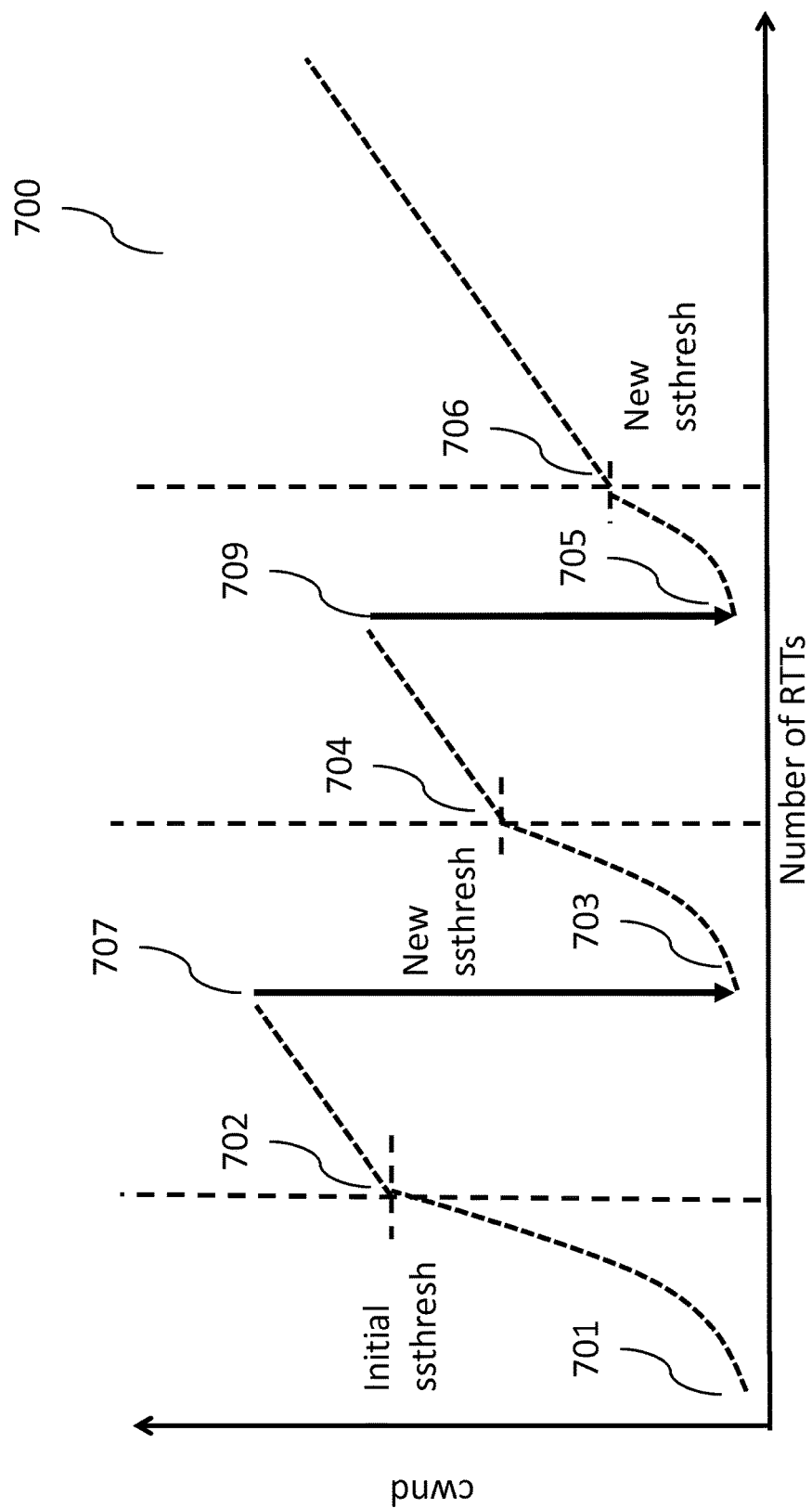
FIG. 7 illustrates further details of congestion window control in TCP communications.

As shown in FIG. 7, a performance of the TCP transmission is illustrated on a plot having a size of congestion window (CNWD) on the vertical axis and number of round-trip times ("RTT") (corresponding to the time that it takes the server to receive an acknowledgement that a packet was received) on the horizontal axis. In the slow start phase, the congestion window continues to grow exponentially from an initial size of the congestion window 701. The size of the window grows until an initial threshold 702, after which the size of the congestion window grows linearly until the server (sending the TCP packets) receives an indication that three duplicate ACKs have been received, at 707. At that time, the size of the congestion window is reset to the initial size 703 (which can be the same as size 701) and the process of growing the size of the congestion window begins again. However, since the size of the congestion window was reset, the ssthresh value is reduced to being smaller than the initial ssthresh 702. The new value of ssthresh 704 can be half of the initial ssthresh 702 (for different TCP implementations (e.g., TCP-Reno, TCP-Vegas, etc.) new ssthresh values can be different and/or congestion avoidance can be implemented in a different fashion). The growth of the size of the congestion window can continue until another three DUP ACKs are received, at 709. At that time, the congestion window is reset to 705 and the value of ssthresh 704 is reduced to ssthresh 706. Then, the process of growing the congestion window can begin again. At some point during this process, the server can determine that the endpoint device is unable to receive its transmissions and terminate the transmission session.

In contrast to an ideal TCP transmission lossless environment, a wireless communications environment can involve a substantial loss of packets. This can cause a server transmitting TCP packet data to constantly reset the congestion window, drop connections, etc., thereby causing substantial delay in delivery of packets, battery drainage, and other undesirable consequences. Data loss can occur as a result of various factors associated with wireless transmissions. For example, in a wireless communications environment, movement of the user equipment from one radio area having a good signal to another radio area having a poor signal can cause delay in delivery of the packets and corresponding ACKs to the server, thereby causing the server to determine that there is congestion on the line. Interference from other radio sources (e.g., other user equipment) can also cause losses. Other factors can affect packet loss as well.

In some cases, mobile communications environment can implement interference rejection combining ("IRC") and/or maximum ratio combining ("MRC"). Using IRC, transmitted signal is regenerated based on estimated data from previous receptions, distortion occurring from the multi-path channels is emulated and, all regenerated interfering signals are subtracted from uplink received signals to obtain more reliable estimation of original users' data. IRC utilizes spatial separation and characteristics of inter-cell interference to determine power of interfering user equipment belonging to another cell. Once the pattern and power level is determined, the cell that is affected by the interference can remove the interferer from the received signals. IRC can be implemented in the eNodeB and can reduce interference impact of the neighboring users in the uplink. Hence, IRC can increase uplink users' throughput. When uplink IRC is used, a maximum signal-to-interference-plus-noise ratio ("SINR") gain of 7 dB can be achieved over traditional MMSE interference reduction method. By comparison, MRC does not make use of the spatial characteristics of the interference when calculating antenna weighting. Thus, in cases where there are only a small number of dominating interfering sources, IRC can provide a better performance than MRC especially when there are a reasonable number of receive antennae for IRC to execute the compensation. Conversely, if there are a large number of equal power signals arriving at the receive antenna, the gain of IRC over MRC might not be as significant.

However, at cell edges both IRC and MRC cause a high residual block error rate ("BLER", which is the in-sync or out-of-sync indication during radio link monitoring ("RLM")). Toward the edges of the cells, the number of retransmission can increase along with an decrease in SINR, causing worsening of the transmissions and increase in number DUP ACKs that are being sent back to the server. This can cause the server to determine that there is congestion and reduce the congestion window threshold value and/or drop a transmission session. However, in most cases, the IRC technique allows for a better cell edge performance than the MRC technique.

Figure 8:
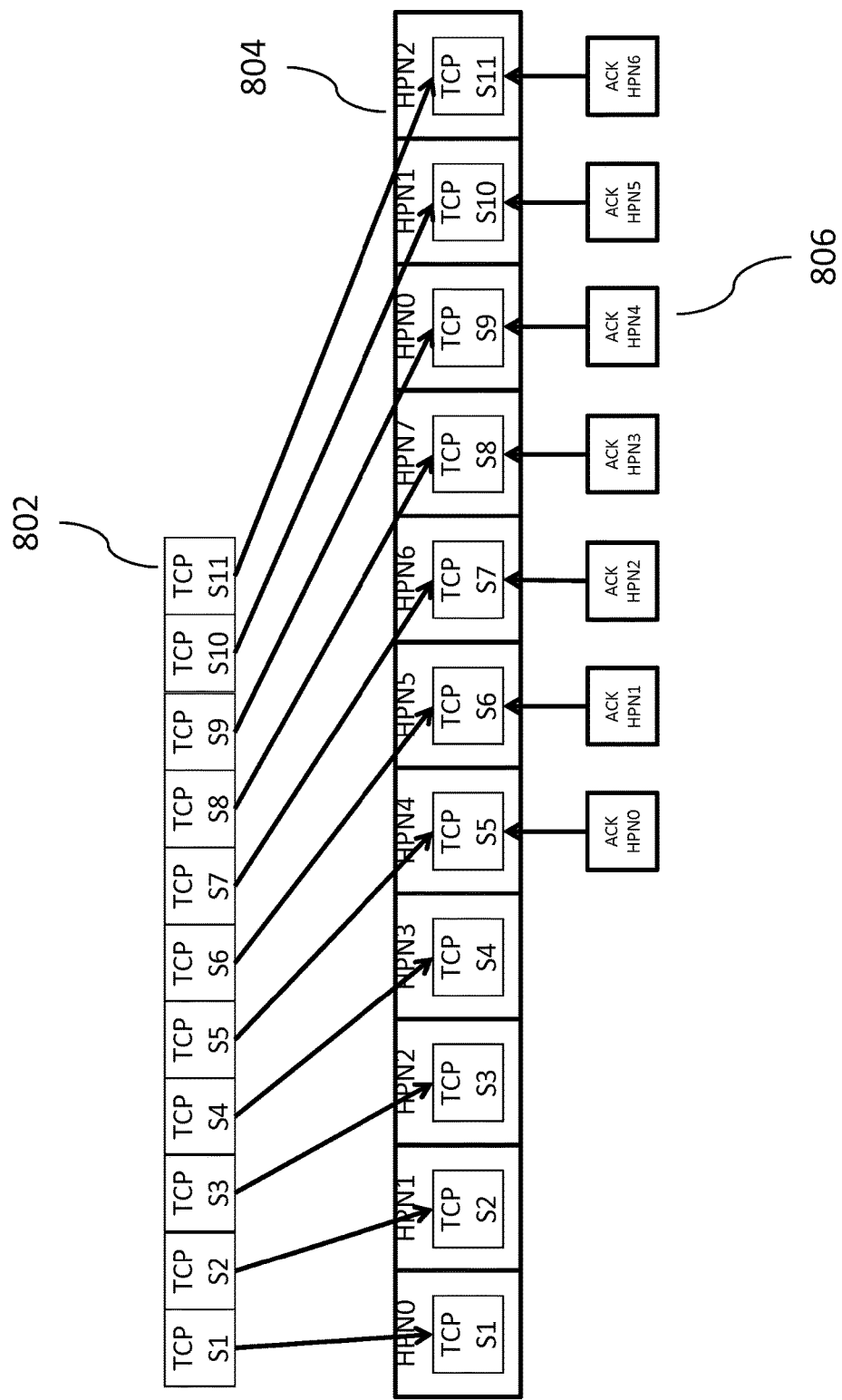
FIG. 8 illustrates an exemplary TCP communications system for transmission of TCP packets.

FIG. 8 illustrates an exemplary TCP data transmission stream 802 containing TCP packets S1, S2, . . . S11 that are being transmitted from a server (not shown in FIG. 8) to a user equipment (no shown in FIG. 8). Each transmitted packet is being transmitted with an appropriate hybrid automatic repeat request process number ("HPN") 804 (i.e., HPN0-HPN7 for every eight subframes (i.e., in this case TCP packets S1-S8 correspond to HPN0-HPN7 and TCP packets S9-S11 correspond to a new set beginning with HPN0). As shown in FIG. 8, TCP packets S1-S7 are acknowledged using ACK HPNs 806 by the receiver (i.e., user equipment) and are sent back to the server that transmitted the original packets.

As shown in FIG. 8, a hybrid automatic repeat request ("HARQ") refers to a combination of high-rate forward error-correcting coding and automatic repeat request ("ARQ") error-control. In ARQ, redundant bits are added to data to be transmitted using an error-detecting ("ED") code, e.g., a cyclic redundancy check ("CRC"). Using ARQ, user equipment that detects a corrupted message requests a new message from the server. In HARQ, data packets are encoded with a forward error correction ("FEC") code, and the parity bits are either immediately sent along with the message or only transmitted upon request when the user equipment detects an erroneous message. In LTE system, when transferring data using the HARQ process, the user equipment and server typically know a process identifier for each of the HARQ process, so that the user equipment can successfully keep each process data without getting them mixed up. The server also informs the user equipment of the HARQ processor number (i.e., HPN) explicitly, as shown in FIG. 8. On the uplink, the same HPN number has to be used by the user equipment every 8 subframes, as is also shown in FIG. 8, to allow the eNodeB to determine which HARQ process is being transmitted.

While FIG. 8 illustrates an ideal situation for lossless transmission of TCP packets, in the real world, such lossless transmission is typically very rare, as transmitted packets may be lost, transmissions may encounter interference from other radio equipment, and/or other interruptions can result in improper transmissions, delays, etc.

Figure 9:
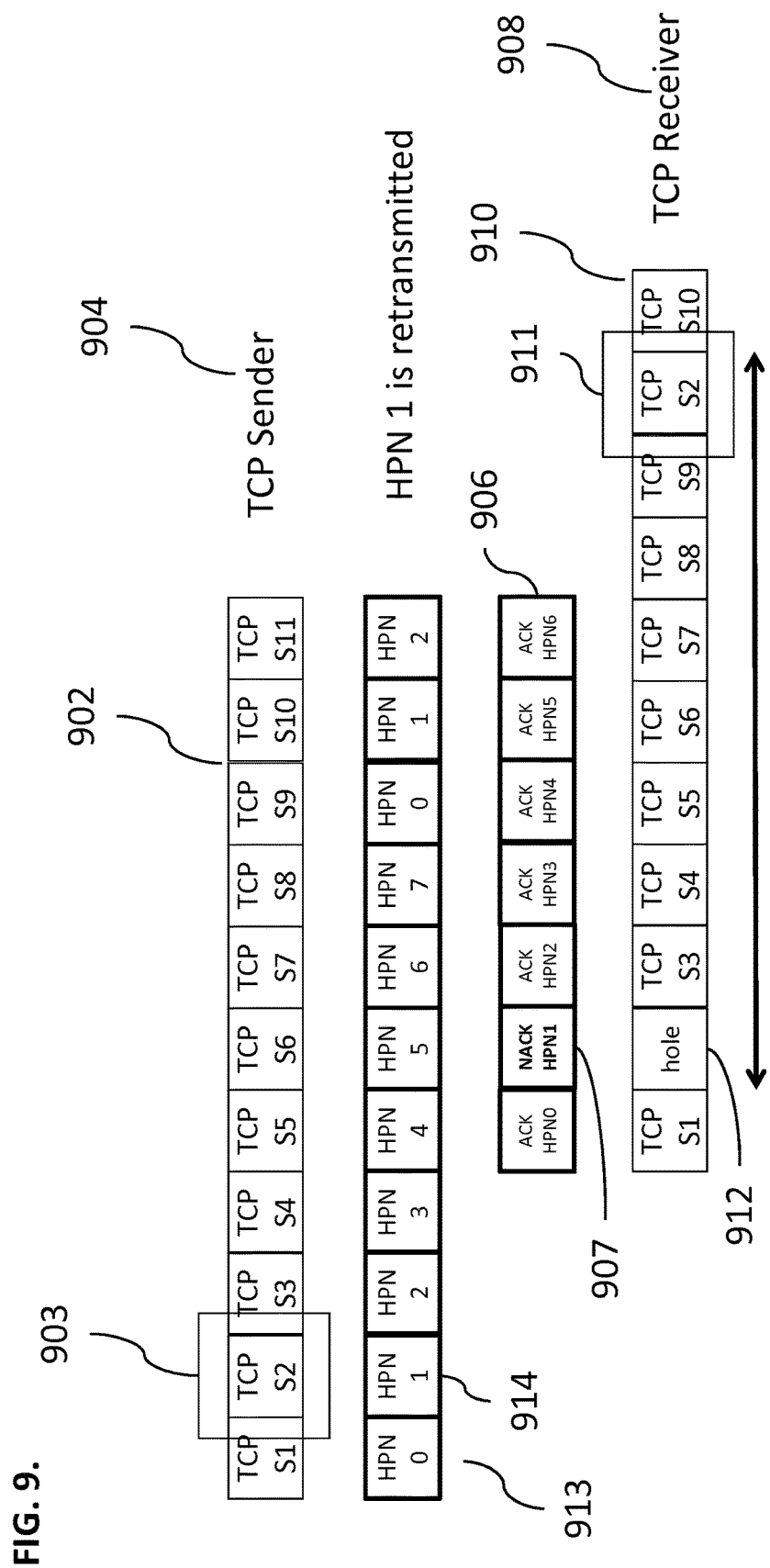
FIG. 9 illustrates an exemplary TCP communications system for transmission of TCP packets, where a receipt acknowledgement for one of the TCP packets is not received.

FIG. 9 illustrates an exemplary transmission of TCP segments S1-S11 902 from a TCP sender 904 (e.g., a server). In this case, a TCP packet S2 903 is not transmitted (e.g., lost, etc.), causing a TCP receiver 908 (e.g., user equipment) to not receive the packet TCP S2 and instead, receive the TCP packet sequence with a "hole" 912. The TCP packet S2 can be retransmitted to the TCP receiver 908, but out of order, i.e., the retransmitted TCP packet S2 911 can appear between transmitted TCP packets S9 and S10. Failure to receive the TCP packet S2 results in the ACK HPN sequence 906 having a NACK (non ACK) HPN1 907, instead of an ACK HPN 1, and causes the associated HPN of the sender 913 to retransmit TCP packet S2 along with HPN 1 that corresponds to the TCP packet S2. In some cases, first such retransmission can cause an 8 ms delay in delivery of the TCP packet S2 as well as an out-of-order delivery of TCP packets in the original TCP sequence. Because packets are now being delivered out of order, duplicate ACKs ("DUP ACKs") are generated and sent back to the sender (which results in TCP sender reducing the congestion window). Any subsequent retransmissions can cause additional 8 ms delays each, where three retransmissions can cause a total of 24 ms delay.

In some case, the retransmissions may or may not be successful. Further, large number of retransmissions can further cause increase in RTT, thereby further creating delay, dropping of connection, etc. Given the lossy nature of wireless communication environment, retransmissions can occur very frequently as a result of receiving DUP ACKs by the TCP senders and causing the TCP senders to unnecessarily retransmit TCP packets.

In some implementations, to prevent unnecessary retransmissions from the server, the current subject matter system (as shown, for example, in FIGS. 4 and 5 above) can allow the eNodeB to buffer TCP segments and DUP ACKs, which are being transmitted back from the TCP receiver (e.g., user equipment) to the TCP sender locally in the eNodeB by the TCP processor. In some implementations, the predetermined number can correspond to receiving three DUP ACKs before a determination can be made that a packet may need to be retransmitted from the local buffer. The current subject matter system can also keep track of a round trip time that it takes for a packet to be transmitted and an ACK to be received between the eNodeB and the user equipment. This can ensure that TCP segments are not unnecessarily retransmitted.

In some implementations, the TCP processor in the eNodeB can keep track (e.g., by storing in a memory location and/or a database located at eNodeB) of a round trip time ("RTT") information indicative of a time that it takes packets to be sent to the TCP receiver and an ACK to be received at the eNodeB. If the eNodeB receives a DUP ACK indication (which can be indicative of a missing packet) earlier than the RTT, then the TCP processor at the eNodeB can determine that the DUP ACK was sent in error and thus, the DUP ACK can be disregarded. The eNodeB can also buffer the TCP segment associated with the received DUP ACK in the event that such segment may need to be retransmitted. Further, the TCP processor can also prevent sending the DUP ACK to the TCP sender, which can also prevent the TCP sender from determining that there is congestion and, as a consequence, reducing the ssthresh value. In some implementations, if a predetermined number of DUP ACKs (e.g., three) is received and RTT has not expired for a particular TCP segment, the eNodeB will not retransmit the segment. In some implementations, if an explicit NACK is received from Layer 2 in the eNodeB for a particular TCP segment, that TCP segment can be retransmitted forcibly by the eNodeB. If the TCP segment is buffered at the eNodeB, then the eNodeB can retransmit the segment to the user equipment.

In some implementations, the TCP processor at the eNodeB can receive a HARQ/ARQ feedback information from Layer 2 associated with the user equipment. The HARQ/ARQ feedback information can be indicative of whether a particular packet was successfully transmitted to the user equipment or not. Based on the received HARQ/ARQ feedback information, the TCP processor can determine whether or not there is a need to retransmit a particular TCP segment. The HARQ/ARQ feedback information can be used in place of and/or together with the receipt of the three DUP ACKs to determine whether or not a retransmission of a particular segment may be required.

Figure 10:
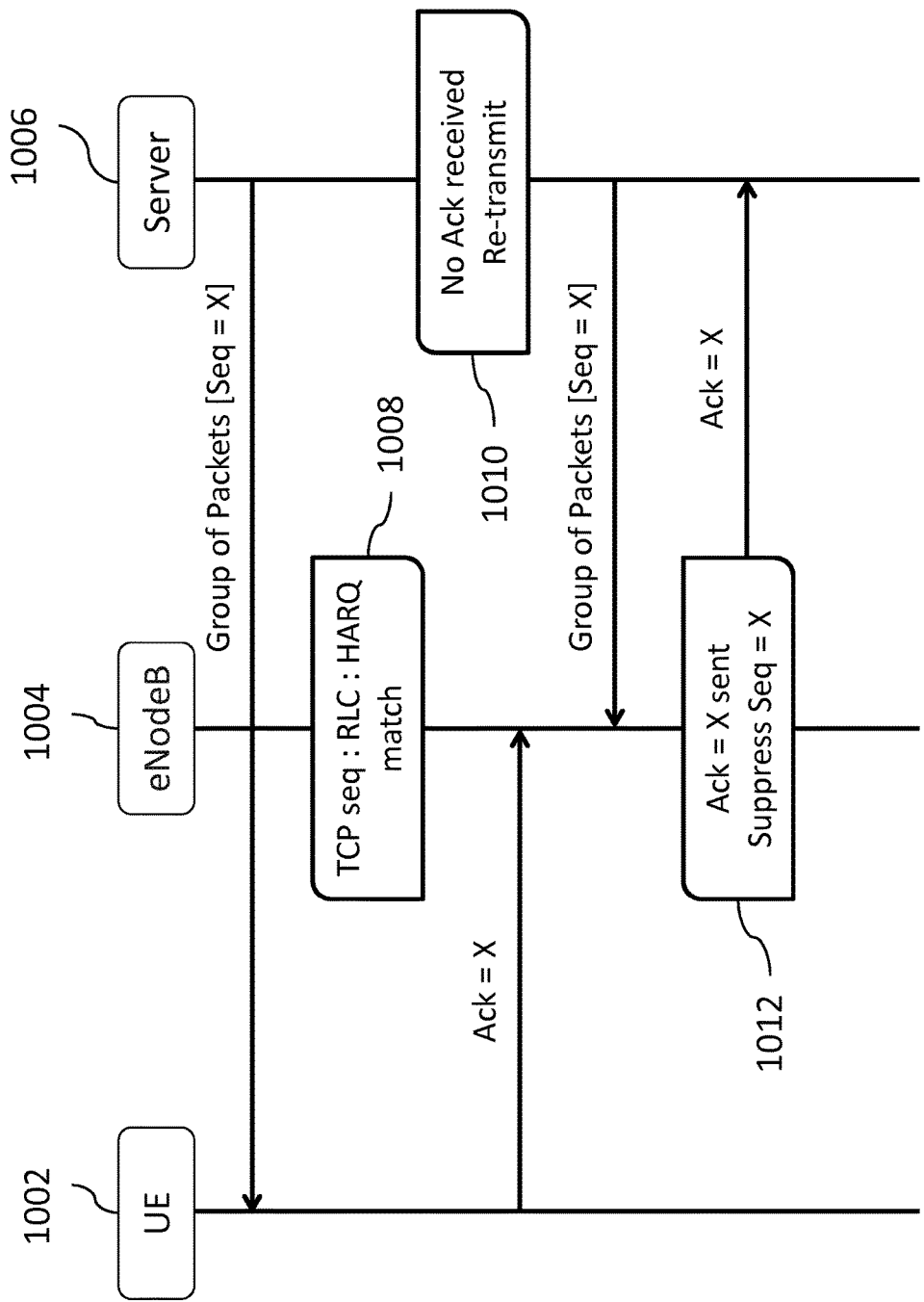
FIG. 10 illustrates an exemplary flow diagram showing current subject matter system's eNodeB's ability to reduce duplicate transmissions of data packets, according to some implementations of the current subject matter.

FIG. 10 illustrates an exemplary flow diagram 1000 showing current subject matter system's eNodeB's 1004 ability to reduce duplicate transmissions of data packets, according to some implementations of the current subject matter. The process 1000 can begin by the server 1006 sending data packets (bearing sequence number X) to the user equipment 1002 via eNodeB 1004. Upon receipt of these data packets, the user equipment 1002 can then send an acknowledgement (bearing acknowledgement ACK=X) to the server via the eNodeB 1004. The eNodeB 1004 can determine whether there is a match of RLC-ARQ and MAC-HARQ information, at 1008. If the server 1006 fails to receive an ACK from the user equipment 1002, the server re-transmits the same data packets, at 1010. Upon determination that there is a match of RLC-ARQ and MAC-HARQ information or an acknowledgement (bearing acknowledgement ACK=X) and receipt of re-transmitted data packets from the server 1006, the eNodeB 1004 can suppress sending re-transmitted data packets to the user equipment 1002 and instead, forward an acknowledgement (ACK=X) to the server 1006 indicating that the original data packets were received by the user equipment 1002. This data packet (bearing sequence number X) can be sent only once from the eNodeB, thereby conserving radio resources associated with the connection between the user equipment 1002 and the eNodeB 1004.

In some implementations, the current subject matter system can use a round trip time out ("RTO") information to determine whether or not a retransmission of a particular TCP segment may be required. The RTO information can be determined based on timing out of the RTT associated with the TCP segments. For the purposes of illustration only, assume that a plurality of TCP segments are transmitted to the user equipment and an indication is received at the eNodeB that one of the TCP segments ("segment A") might have been lost. A DUP ACK for the next TCP segment ("segment B") is generated. The TCP processor (e.g., TCP processor 508 shown in FIG. 5) can buffer segment A and await receipt of three DUP ACKs before retransmitting segment A from its buffer (e.g., buffer 510 shown in FIG. 5). The TCP processor at eNodeB can also keep track of the RTT information indicative of the TCP segment transmissions and can retransmit the TCP segments after RTT is timed out.

In some implementations, the RTO can be determined based on the RTT information associated with the last TCP segment that has been transmitted to the user equipment and standard deviation values associated with an expected RTT for a particular communication between the eNodeB and user equipments.

Figure 11:
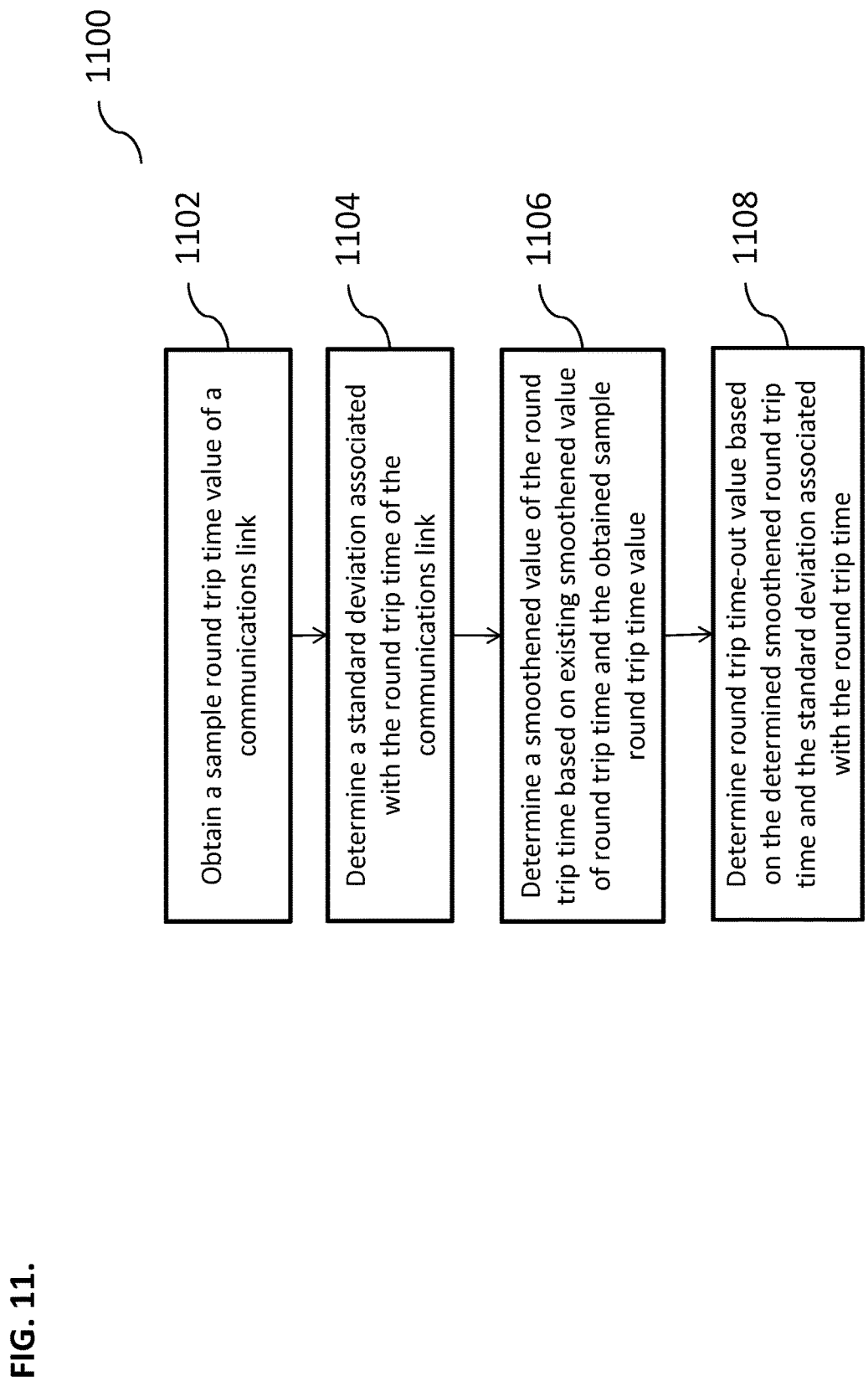
FIG. 11 illustrates an exemplary process for determining a round trip time out value for a particular communication link between a user equipment and an eNodeB (as shown for example in FIG. 5), according to some implementations of the current subject matter.

FIG. 11 illustrates an exemplary process 1100 for determining a round trip time out value for a particular communication link between a user equipment and an eNodeB (as shown for example in FIG. 5), according to some implementations of the current subject matter. At 1102, the TCP processor (e.g., TCP processor 508 as shown in FIG. 5) can obtain and/or measure a sample round trip time value ("rttM") associated with transmission of TCP packets on a communications link between the eNodeB and a user equipment. The rttM can be determined based on a time difference between a time of receiving an ACK ("$T_{receive}$") and a sample time of sending a TCP packet to the user equipment ("$T_{sent}$"):

$$rttM = \text{diff}(T_{receive}, T_{sent}) \quad (1)$$

At 1104, a standard deviation value ("rttD") can be determined for the round trip times associated with the communications link between the eNodeB and the user equipment. The rttD can be determined using the value of existing standard deviation value ("$rttD_{exist}$"), which may have been previously calculated for other packets in the communication link, and an absolute difference between a smoothened round trip time ("rttS") and the rttM. The rttD can be determined based on the following:

$$rttD = \alpha * rttD + \beta * |rttS - rttM| \quad (2)$$

where $\alpha + \beta = 1$, and $\alpha$ and $\beta$ can be experimentally determined for a particular communications link. In some implementations, $\alpha > \beta$. For illustrative purposes only, $\alpha = 0.75$ and $\beta = 0.25$. Other values are possible.

The smoothened round trip time can be determined based on the existing value of the smoothened round trip time ("$rttS_{exist}$") and a measured value, at 1106, using the following:

$$rttS = \gamma * rttS_{exist} + \delta * rttM \quad (3)$$

where $\gamma + \delta = 1$, and $\gamma$ and $\delta$ can be experimentally determined for a particular communications link. In some implementations, $\gamma > \delta$. For illustrative purposes only, $\gamma = 0.875$ and $\delta = 0.125$. Other values are possible.

The round trip time-out value ("rttO") can be determined based on the smoothened round trip time value and calculated standard deviation value, at 1108, as follows:

$$rttO = rttS + \epsilon * rttD \quad (4)$$

where $\epsilon$ can be experimentally determined for a particular communications link. In some implementations and for illustrative purposes only, $\epsilon = 4$. Other values are possible.

In some implementations, for the first sample, rttS=0 and rttD=rttM/2. As can be understood, other values can be used based on requirements, conditions, particular user equipment, eNodeB, transmissions, etc. in the communications link between the eNodeB and the user equipment.

In some implementations, using the round trip time out value, the TCP processor in the eNodeB can determine whether or not to retransmit a particular buffered TCP segment. The TCP processor can use the determined round trip time out value alone in its determination whether or not to retransmit a particular TCP segment, and/or in combination receiving a predetermined number of DUP ACKs and/or particular values of round trip time, and/or receiving a ACK/NACK from Layer 2.

In some implementations, the TCP processor at the eNodeB can a receive a NACK, which can indicated that a TCP segment corresponding to the NACK did not reach the user equipment. If such NACK is received, the eNodeB can retransmit the segment corresponding to the NACK from the buffer of the eNodeB. In some implementations, upon determining that a retransmission of a segment is required, the TCP processor in the eNodeB can also assign a higher priority (e.g., place a high priority identifier in the packet's header) to the retransmitted packet and schedule its retransmission ahead of other packets. In some implementations, the retransmitted packet bearing the higher priority can be retransmitted earlier than the round trip time for that communications link.

Thus, the current subject matter can allow for buffering of TCP segments and determination of which segments need to be retransmitted, thereby shielding the TCP sending server from unnecessary retransmission of packets and reduction of congestion window. As stated above, this can be accomplished by an application intelligence component of a base station (e.g., as shown in FIG. 5, TCP processor 508 in the eNodeB 504) that can use channel quality indicator ("CQI"), HARQ/ARQ feedback information (including BLER information) from Layer 2 components, average round trip time information for TCP segments delivery, number of DUP ACKs it receives, a receipt of a NACK, a round trip time out information, and/or any other information to determine whether or not to retransmit a particular TCP segment. The application intelligence layer can automatically retransmit a packet upon ascertaining that certain conditions are met. These can include, but are not limited to a receipt of a predetermined number of DUP ACKs, a receipt of NACK, a determination of a particular RTO, and/or any others. The retransmissions can occur automatically, manually, and/or both. By eliminating unnecessary retransmissions, the current subject matter can improve a quality of service ("QoE") and increase transmission capacity.

B. Receive Window Size Adaptation

In some cases, by sending too many packets, the TCP sender (e.g., a TCP server) can cause a buffer of eNodeB (e.g., buffer 510 of eNodeB 504 as shown in FIG. 5) to overflow. This can occur in view of the buffer having a limited amount of space (or a receive window ("R-WND")) that can accommodate incoming packets from the TCP sender.

Figure 12:
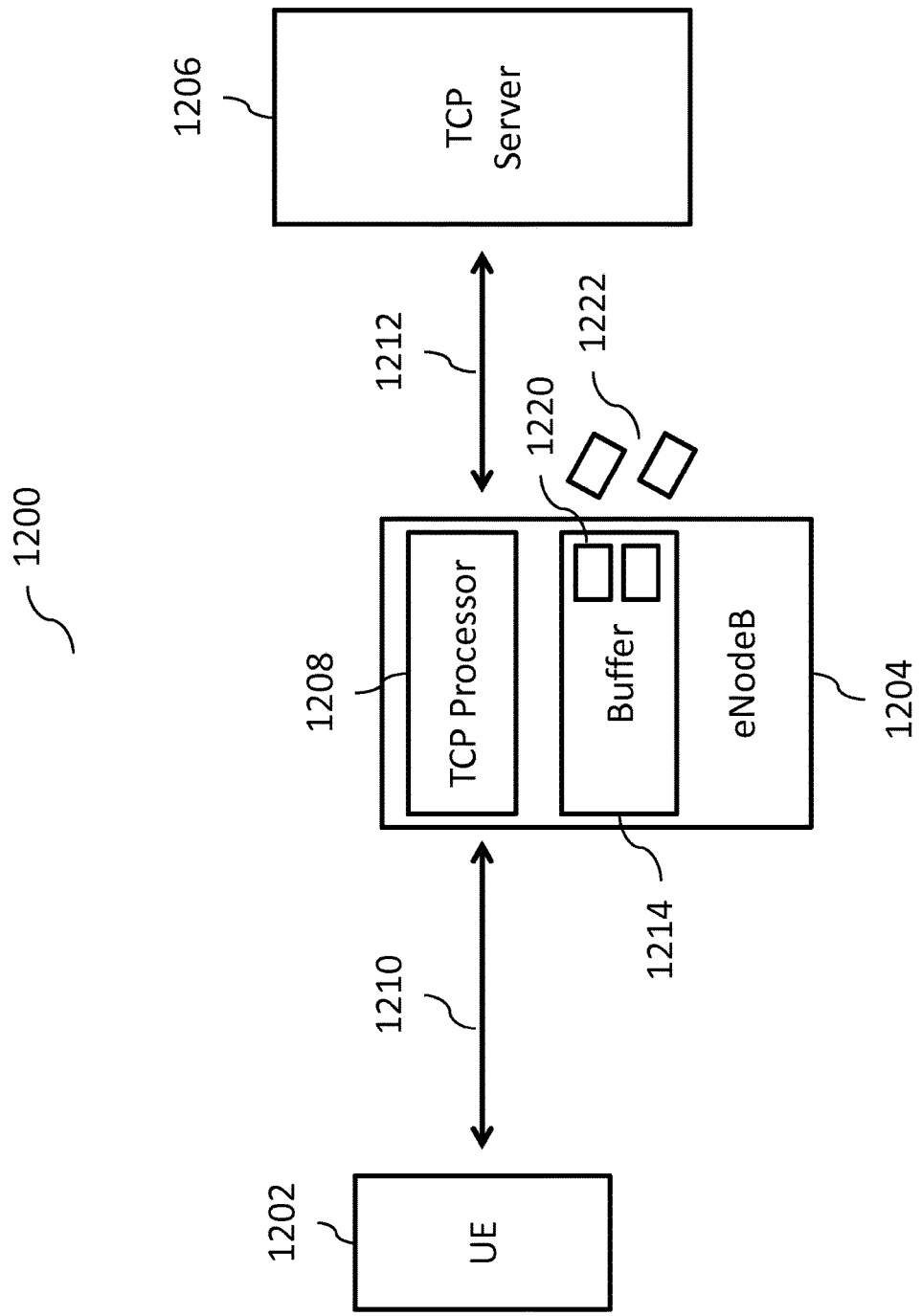
FIG. 12 illustrates an exemplary a communications system that can resolve a buffer overflow situation, according to some implementations of the current subject matter.

FIG. 12 illustrates an exemplary a communications system 1200 that can resolve a buffer overflow situation, according to some implementations of the current subject matter. The system 1200 can include a user equipment 1202, a base station 1204 (e.g., an eNodeB), and a TCP server 1206. The user equipment 1202 can communicate with the eNodeB 1204 via communications link 1210. The eNodeB 1204 can communicate with the TCP server 1206 via communications link 1212. The TCP server 1206 can send TCP packets to the eNodeB 1204 for transmission to the user equipment 1202. The eNodeB 1204 can store the packets in a buffer 1214. As shown in FIG. 12, while TCP packets 1220 can be stored in the buffer 1214, other TCP packets 1222 can be rejected in view of the buffer 1214 being overflowed (e.g., not having enough memory to store data). Buffer overflow can be caused by conditions of the communication links (e.g., CQI, etc.), inability of the user equipment to handle a certain amount of data (e.g., user equipment bandwidth), lack of usable space at the buffer of the eNodeB, etc. The packets 1222 can be discarded for failure to be stored in the buffer 1214. Such discarding can indicate packet loss, which can cause the TCP server 1206 to determine that there is congestion.

In some implementations, to avoid buffer overflow, the TCP Processor 1206 can be provided with buffer status report ("BSR") information of lower Layer's buffer (e.g., RLC/MAC buffer in Layer 2), which can indicate whether or not the buffer 1214 can accept a particular amount of data being sent by the server 1206. The buffer status report can be provided by lower Layers components such as Layer 2 components of the eNodeB 1204. The buffer status report can be used to determine a bandwidth associated with particular user equipment and a buffer occupancy threshold (which can be based on the determined bandwidth associated with the user equipment) for the TCP Processor's buffer 1214. In some implementations, different buffer occupancy threshold can be set for different priority packets. Once the value(s) of the buffer occupancy threshold(s) is ascertained, the information can be provided by the eNodeB 1208 to the TCP server 1206 along with an ACK that a particular transmission of TCP segments from the TCP server 1206 has been received by the eNodeB 1204. This information can indicated to the TCP server 1206 that the eNodeB 1204 has a particular receive window ("R-WND"), beyond which a buffer overflow can occur. This can allow the TCP server 1206 to moderate that amount of data that is being sent to the eNodeB 1204.

The R-WND can be determined using a round trip time ("rtt") associated with a communications link between the user equipment 1202 and the eNodeB 1204. The determination can also use an average link rate ("$R_{link}$"), which can be provided by the PDCP component of the eNodeB 1204 and determined based on a rate at which buffer is cleared by the MAC/RLC components of the eNodeB 1204. The R-WND can also be based on a queue control parameter ("$Q_{control}$"), which can be determined based on the particular communications link, and a maximum queue size per bearer ("$Q_{max}$"), which can be based on a total queue size. For illustrative purposes only, $Q_{control}=2$. Other values are possible. The total number of buffered bytes ("$T_{buffer}$"), which can be determined based on a combination of buffer sizes of buffers at the PDCP component (not shown in FIG. 12) and buffer 1214, and a number of active transmission flows ("$N_{active}$") can also be used in determining the R-WND. Thus, the R-WND can be determined using the following:

$$R\text{-}WND=(rtt*(R_{link}+(Q_{control}*(Q_{max}-T_{buffer}))))/N_{active} \qquad (5)$$

The determined R-WND can be supplied to the TCP server 1206. The TCP server 1206 can adjust the amount of data that is being sent to the user equipment via the eNodeB. This can eliminate packet loss, maintain consistent round trip times for TCP packet transmissions, as well as keep a steady TCP packet flow rate from the TCP server to the user equipment and via the eNodeB.

C. TCP State Aware Scheduler

One of the functions of the eNodeB 106 referred to in Layer 3 of FIG. 1C is radio resource management ("RRM"), which includes scheduling of both uplink and downlink air interface resources for user equipment 104, control of bearer resources, and admission control. The RRM function ensures efficient use of the available network resources. In particular, RRM in E-UTRAN manages (e.g., the ME and assign, reassign, and release) radio resources in single and multi-cell environments. RRM is treated as a central application at the eNodeB responsible for interworking between different protocols so that messages are properly transferred to different nodes across Uu, S1, and X2 interfaces. RRM interfaces with operation and management functions in order to control, monitor, audit, or reset the status due to errors at a protocol stack.

The RRM includes modules for radio bearer control ("RBC"). The RBC functional module manages the establishment, maintenance, and release of radio bearers. The RRM also includes modules for connection mobility control ("CMC"). The CMC module manages radio resources in the idle and connected modes. In the idle mode, this module defines criteria and algorithms for cell selection, reselection, and location registration that assist the user equipment in selecting or camping on the best cell. In addition, the eNodeB broadcasts parameters that configure the user equipment measurement and reporting procedures. In the connected mode, this module manages the mobility of radio connections without disruption of services.

The RRM also includes modules for dynamic resource allocation ("DRA") and/or packet scheduling ("PS"). The task of DRA or PS is to allocate and de-allocate resources (including physical resource blocks) to user and control-plane packets. The scheduling function typically considers the QoS requirements associated with the radio bearers, the channel quality feedback from the user equipments, buffer status, inter-cell/intra-cell interference condition, and the like. The DRA function takes into account restrictions or preferences on some of the available resource blocks or resource-block sets due to inter-cell interference coordination ("ICIC") considerations.

The radio access network including the eNodeBs provided therein is responsible for handling all radio-related functionality including scheduling of radio resources. The core network is responsible for routing calls and data connections to external networks.

The scheduler in the eNodeB is generally responsible for assigning radio resources to all user equipments and radio bearers both in the uplink and downlink. The scheduler in the eNodeB allocates resource blocks (which are the smallest elements of resource allocation) to users for predetermined amounts of time.

Data packets in a communication network correspond to different applications having different, and in some instances, non-standardized formats for the underlying data payload. Without knowledge of the data packet payload, and its corresponding application, coordination of communication of a data packet is provided in a generic fashion. At an eNodeB, assignment of resource blocks occurs at approximately 1 ms intervals. Detection of packet data and corresponding applications outside of the eNodeB, such as using devices in the core network or at the user device, cannot accurately account for changes in the channel conditions that occur at the 1 ms intervals at which the eNodeB assigns resource blocks. For example, an eNodeB can decide the type of modulation encoding mechanism for a data packet transmission, for example, using quadrature amplitude modulation QAM—including 16-QAM, 64-QAM, or the like) and/or quadrature phase shift keying (QPSK) every 1 ms. Such decisions are based on the channel conditions present during the time slice at which the base station is assigning the resource blocks.

In some implementations, in order to accurately assign resource blocks based on the real-time channel conditions at the base station, the eNodeB includes a module and/or processor for inspecting the data packet, including the application type of the data packet, and a module and/or processor for scheduling and assigning resource blocks.

Figure 13:
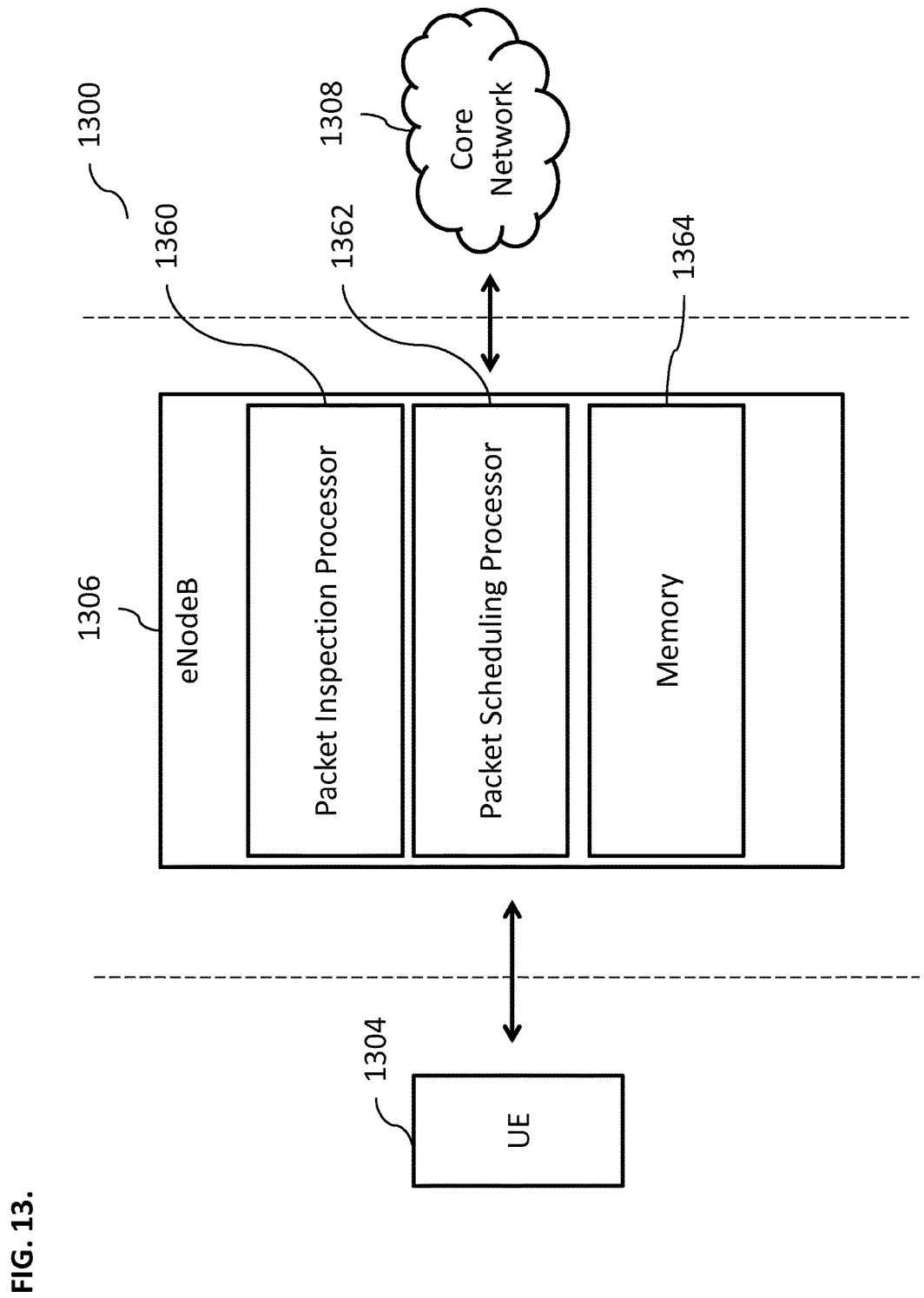
FIG. 13 illustrates an exemplary system including an eNodeB for coordinating communication between a user equipment and a core network, according to some implementations of the current subject matter.

FIG. 13 illustrates an exemplary system 1300 including an eNodeB 1306 for coordinating communication between a user equipment 1304 and a core network 1308, according to some implementations of the current subject matter. The eNodeB 1306 can correspond to an eNodeB shown and described above with reference to FIG. 3. In the case of C-RAN architecture, such as the one shown in FIG. 3, the eNodeB 1306 can correspond to the intelligent baseband unit 304. The eNodeB 1306 can include a packet inspection processor 1360, a packet scheduling processor 1362, and a memory 1364. While shown as separate components in FIG. 13, the packet inspection processor 1360, a packet scheduling processor 1362, and the memory 1364 can be integrated in one or more processing components. In some implementations, the packet inspection processor 1360 and the packet scheduling processor 1362 can be provided as software modules in a processor that is specifically programmed to implement the functions described herein with reference to these processors.

In some implementations, the packet inspection processor 1360 can perform a packet inspection on each data packet that is transmitted between the user equipment 1304 and the core network 1308 in order to determine, for example the application type of the data packet. An application type may correspond to, for example, audio, video, email, and/or any other type. The packet inspection processor 1360 communicates the detected application type and/or other information that is derived from the data packet to the packet scheduling processor 1362. The packet scheduling processor 1362 can assign resource blocks based on predefined settings stored in memory 1364 corresponding to the information detected through inspection of the data packet and based on the channel conditions of the communication link with the user equipment and/or the core network.

The packet scheduling processor 1362 can take into account the application type, the size of the file associated with the data packet, the provider of the content, the user device type or profile information associated with the user, QoS requirements for the data packet, a channel quality indication ("CQI") determined by the eNodeB 1306, a buffer status report ("BSR") of the eNodeB buffer, a power headroom report ("PHR"), and/or a predefined priority for the content corresponding to the data packet content.

Referring back to FIGS. 2 and 3, the packet inspection processor 1360 can correspond to a function that is part of layer 3 functions in the base station 106, 306. In some implementations, the packet inspection processor 1360 can also be provided on a separate functional layer from the functional layers described with reference to FIGS. 2 and 3. The packet inspection processor 1360 can communicate and coordinate with other functions performed by the base station 1306. For example, the packet inspection processor 1360 can coordinate with the radio resource management functions described above with reference to FIG. 2.

In some implementations, the packet scheduling processor 1362 can be provided on in layer 2 of the base station as shown in FIGS. 2 and 3. In those implementations in which functions of layer 2 are subdivided between the iBBU 306 and iRRHs 302, the packet scheduling processor 1362 can be implemented as part of the layer 2 functions that remain with the iBBU 306. The packet scheduling processor 1362 can also be provided on a separate functional layer from the functional layers described with reference to FIGS. 2 and 3. The packet scheduling processor 1362 can be configured to communicate and coordinate with other functions performed by the base station 1306. In some implementations, the packet scheduling processor 1362 can coordinate with the MAC layer, and in particular, a hybrid automatic repeat request ("HARQ") manager of the MAC layer, as well as, with a physical layer of the base station.

In some implementations, the scheduling processor 1360 in the eNodeB 1306 can also determine state of TCP data transmissions, perform control of initial window, receive window, and congestion window, perform TCP splicing at the eNodeB 1306, include a client-less model for maximum applicability, reduce round trips per page of data, allow progressive rendering, and parallelize obtaining of data (e.g., web objects).

Figure 14:
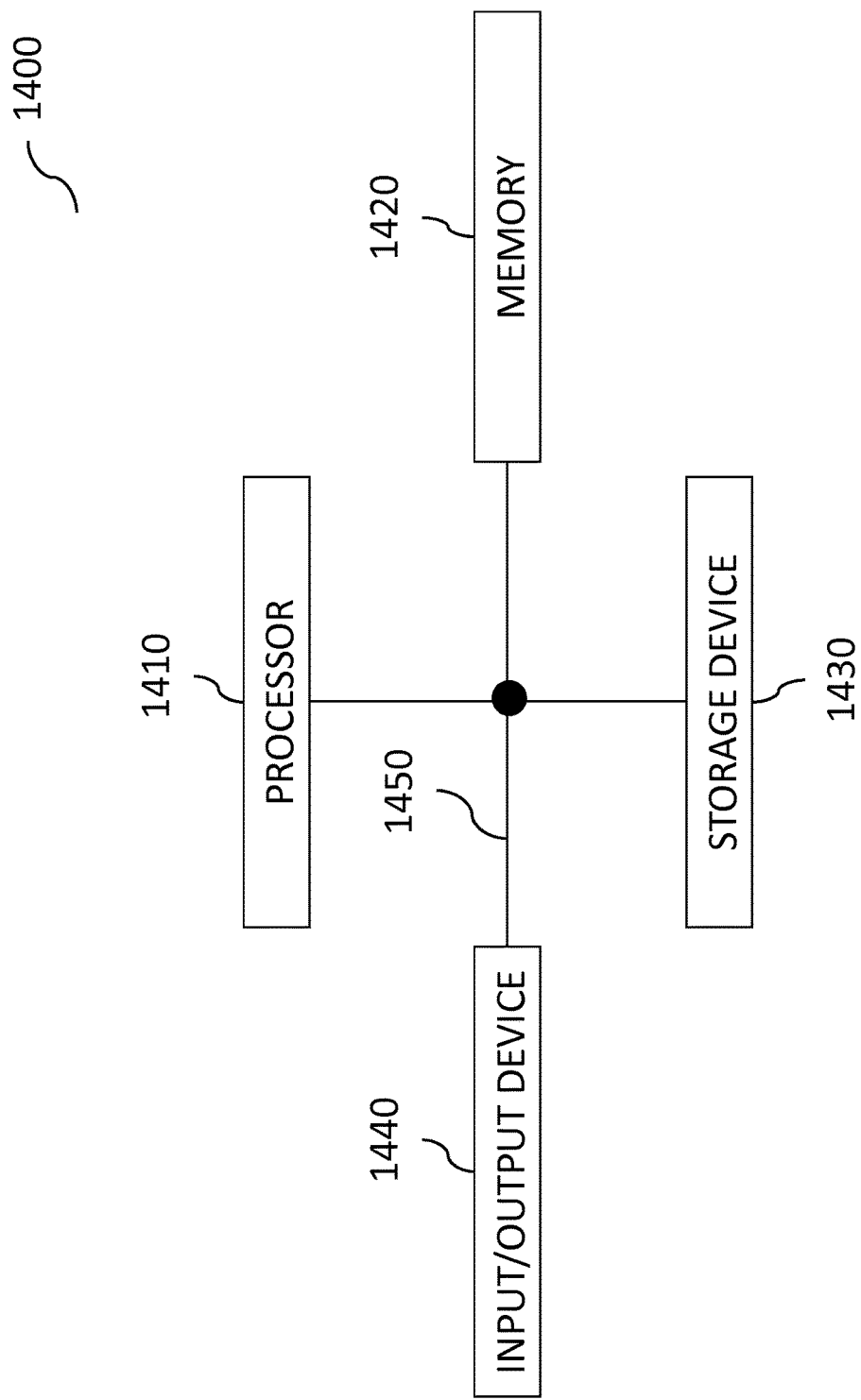
FIG. 14 illustrates an exemplary system, according to some implementations of the current subject matter.

In some implementations, the current subject matter can be configured to be implemented in a system 1400, as shown in FIG. 14. The system 1400 can include one or more of a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 600. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

Figure 15:
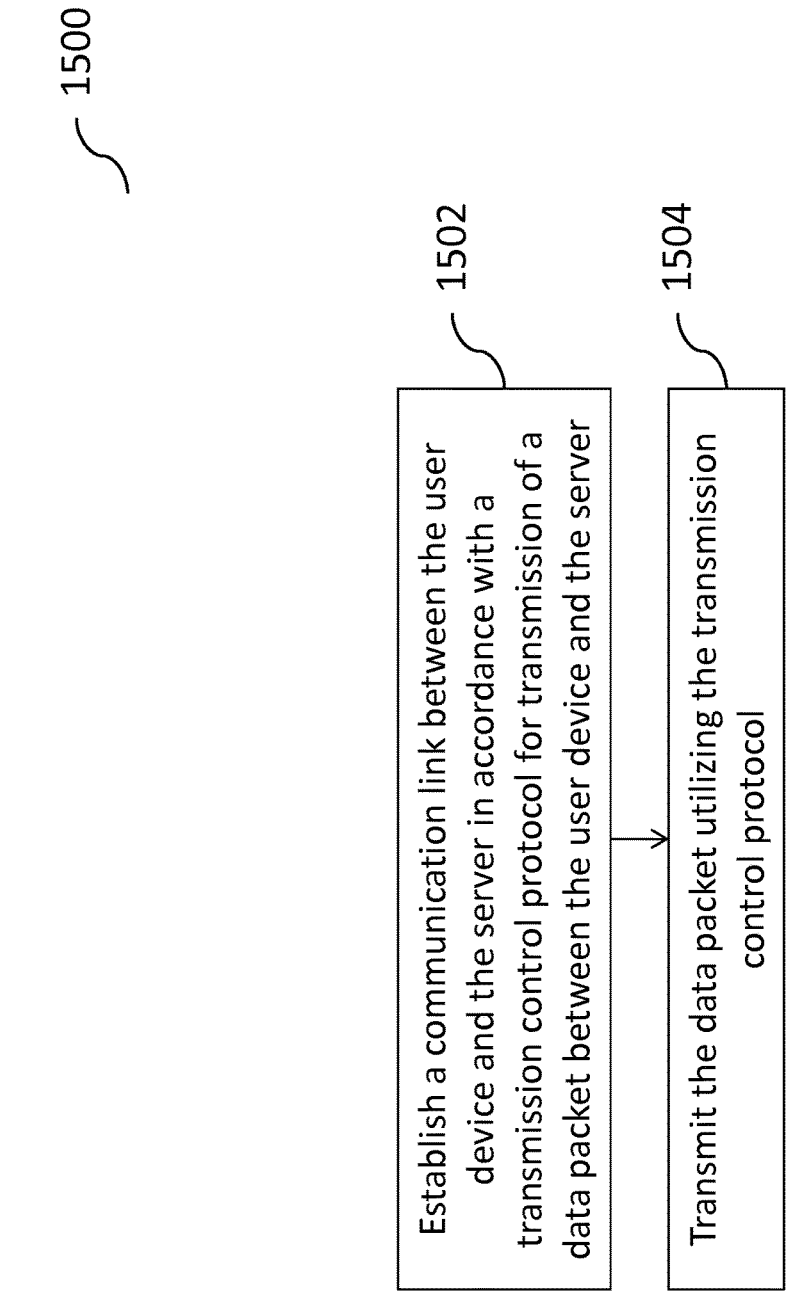
FIG. 15 illustrates an exemplary method, according to some implementations of the current subject matter.

FIG. 15 illustrates an exemplary method 1500 for transmission of data packets between a user device and a server, according to some implementations of the current subject matter. The method 1500 can be performed using a base station (e.g., an eNodeB as described above and shown in FIGS. 3-14). At 1502, a communication link can be established between the user device and the server in accordance with a transmission control protocol for transmission of a data packet between the user device and the server. At 1504, the data packet can be transmitted utilizing the transmission control protocol. At least one of the establishing and the transmitting can be performed using at least one processor of at least one computing system.

In some implementations, the current subject matter can include one or more of the following optional features. An evolved node (eNodeB) base station can perform operations of the method 1500, where the eNodeB base station can include the at least one processor and the at least one memory.

In some implementations, the method can further include storing, using the at least one memory of the base station, data packets received from the server, the stored data packets include at least one transmission control protocol (TCP) data packet. The method can further include transmitting, using the at least one processor of the base station, at least one data packet stored in the at least one memory from the base station to the user device. The method can also include re-transmitting, using the at least one processor of the base station, at least one data packet stored in the at least one memory from the base station to the user device. In some implementations, the method can include receiving, using the at least one processor of the base station, at least one acknowledgement from the user device indicating that the at least one data packet is received by the user device. In some implementations, the method can also include receiving, using the at least one processor of the base station, at least one duplicate acknowledgement from the user device indicating that the at least one data packet is received by the user device, and re-transmitting, after receiving a predetermined number of duplicate acknowledgements from the user device, using the at least one processor of the base station, the at least one data packet stored in the at least one memory to the user device.

In some implementations, the method can also include receiving, using the at least one processor of the base station, at least one non-acknowledgement from the lower layer of the eNodeB indicating that the at least one data packet has not been received by the user device, re-transmitting, after receiving the non-acknowledgement from the lower layer of the eNodeB, using the at least one processor, the at least one data packet stored in the at least one memory to the user device. The non-acknowledgement can be generated by at least one of the following: a packet data convergence protocol (PDCP) layer of the eNodeB, a media access control (MAC) layer of the eNodeB, and a radio link control (RLC) layer of the eNodeB.

In some implementations, the method can include determining, using the at least one processor of the base station, a round trip time information for the at least one data packet, the round trip time information includes time taken by a transmission of the at least one data packet to the user device and a transmission of an acknowledgement by the user device indicative of the receipt of the data packet; and re-transmitting, based on the determined round trip time, using the at least one processor of the base station, the at least one data packet stored in the at least one memory to the user device.

In some implementations, the method can also include re-transmitting, using the at least one processor of the base station, the at least one data packet stored in the at least one memory to the user device using high priority indication.

In some implementations, at least one processor of the base station can prevent re-transmission of the data packet from the server to the user device upon the server failing to receive an acknowledgement from the user device within a predetermined period of time. The base station's processor can send to the server the acknowledgement indicating receipt of the data packet by the user device upon the processor sending a hybrid automatic repeat request (HARQ) data packet to the user device, and receiving, in response to the sending, a confirmation from the user device that the data packet was received by the user device.

In some implementations, the base station's processor can send to the server an acknowledgement indicating a receipt of the data packet by the user device upon receiving a confirmation that the data packet was received by the user device, the confirmation being generated by at least one of the following: a media access control (MAC) layer of the eNodeB, a packet data convergence protocol (PDCP) layer of the eNodeB, and a radio link control (RLC) layer of the eNodeB.

In some implementations, the base station's processor can schedule transmission of the data packet from the server to the user device using the transmission control protocol. The base station's processor can perform congestion avoidance on the communication link during transmission of the data packet using transmission control protocol.

In some implementations, the base station's processor can determine a total size of data packets that can be received by the base station, and provide an indication of the determined total size to the server. The total size of data packets can be determined based on at least one of the following: a storage threshold of the at least one memory, a current capacity of the at least one memory based on existing data stored in the at least one memory, a strength of a radio signal existing between the user device and the eNodeB base station, a quality of a radio signal existing between the user device and the eNodeB base station, an estimated bit rate of data traversing between the user device and the eNodeB based on the at least one buffer status report from at least one of the following: a media access control (MAC) layer of the eNodeB, a packet data convergence protocol (PDCP) layer of the eNodeB, and a radio link control (RLC) layer of the eNodeB, and an ability of the user device to receive data packets having a predetermined size.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A device for transmission of data packets between a user device and a server, the device comprising:
   an evolved node (eNodeB) base station, the eNodeB base station comprising
   at least one memory; and
   at least one processor operatively coupled to the memory, the at least one processor being configured to:
      establish a communication link between the user device and the server in accordance with a transmission control protocol for transmission of a data packet between the user device and the server;
      transmit the at least one data packet utilizing the transmission control protocol, the at least one data packet being stored in the at least one memory based on at least one buffer occupancy threshold determined based on a priority of the at least one data packet;
      determine a total size of data packets that can be received by the base station; and
      provide an indication of the determined total size to the server;
      wherein the total size of data packets is determined based on at least one of the following:
         a storage threshold of the at least one memory,
         a current capacity of the at least one memory based on existing data stored in the at least one memory,
         a strength of a radio signal existing between the user device and the eNodeB base station,
         a quality of a radio signal existing between the user device and the eNodeB base station,
         an estimated bit rate of data traversing between the user device and the eNodeB based on the at least one buffer status report from at least one of the following: a media access control (MAC) layer of the eNodeB, a packet data convergence protocol (PDCP) layer of the eNodeB, and a radio link control (RLC) layer of the eNodeB, and
         an ability of the user device to receive data packets having a predetermined size.

2. The device according to claim 1, wherein the at least one memory is configured to store data packets received from the server, the stored data packets include at least one transmission control protocol (TCP) data packet.

3. The device according to claim 2, wherein the at least one processor causes transmission of at least one data packet stored in the at least one memory from the base station to the user device.

4. The device according to claim 3, wherein the at least one processor causes re-transmission of at least one data packet stored in the at least one memory from the base station to the user device.

5. The device according to claim 4, wherein the at least one processor receives at least one acknowledgement from the user device indicating that the at least one data packet is received by the user device.

6. The device according to claim 5, wherein the at least one processor receives at least one duplicate acknowledgement from the user device indicating that the at least one data packet is received by the user device;
wherein, after receiving a predetermined number of duplicate acknowledgements from the user device, the at least one processor causes the retransmission of the at least one data packet stored in the at least one memory to the user device.

7. The device according to claim 4, wherein the at least one processor receives at least one non-acknowledgement from the lower layer of the eNodeB indicating that the at least one data packet has not been received by the user device;
wherein, after receiving the non-acknowledgement from the lower layer of the eNodeB, the at least one processor causes the retransmission of the at least one data packet stored in the at least one memory to the user device.

8. The device according to claim 7, wherein the non-acknowledgement being generated by at least one of the following: a packet data convergence protocol (PDCP) layer of the eNodeB, a media access control (MAC) layer of the eNodeB, and a radio link control (RLC) layer of the eNodeB.

9. The device according to claim 4, wherein the at least one processor determines a round trip time information for the at least one data packet, the round trip time information includes time taken by a transmission of the at least one data packet to the user device and a transmission of an acknowledgement by the user device indicative of the receipt of the data packet;
wherein, based on the determined round trip time, the at least one processor causes the retransmission of the at least one data packet stored in the at least one memory to the user device.

10. The device according to claim 4, wherein the at least one processor causes the retransmission of the at least one data packet stored in the at least one memory to the user device using high priority indication.

11. The device according to claim 4, wherein the at least one processor being configured to prevent re-transmission of the data packet from the server to the user device upon the server failing to receive an acknowledgement from the user device within a predetermined period of time.

12. The device according to claim 11, wherein the at least one processor being configured to send to the server the acknowledgement indicating receipt of the data packet by the user device upon the at least one processor
sending a hybrid automatic repeat request (HARQ) data packet to the user device; and
receiving, in response to the sending, a confirmation from the user device that the data packet was received by the user device.

13. The device according to claim 11, wherein the at least one processor being configured to send to the server an acknowledgement indicating a receipt of the data packet by the user device upon receiving a confirmation that the data packet was received by the user device, the confirmation being generated by at least one of the following: a media access control (MAC) layer of the eNodeB, a packet data convergence protocol (PDCP) layer of the eNodeB, and a radio link control (RLC) layer of the eNodeB.

14. The device according to claim 1, wherein the at least one processor being configured to schedule transmission of the data packet from the server to the user device using the transmission control protocol.

15. The device according to claim 14, the at least one processor being configured to perform congestion avoidance on the communication link during transmission of the data packet using transmission control protocol.

16. A computer-implemented method for transmission of data packets between a user device and a server, the method comprising:
establishing a communication link between the user device and the server in accordance with a transmission control protocol for transmission of a data packet between the user device and the server; and
transmitting the at least one data packet utilizing the transmission control protocol, the at least one data packet being stored in the at least one memory based on at least one buffer occupancy threshold determined based on a priority of the at least one data packet;
determining a total size of data packets that can be received by the base station; and
providing an indication of the determined total size to the server;
wherein the total size of data packets is determined based on at least one of the following:
a storage threshold of the at least one memory,
a current capacity of the at least one memory based on existing data stored in the at least one memory,
a strength of a radio signal existing between the user device and the eNodeB base station,
a quality of a radio signal existing between the user device and the eNodeB base station,
an estimated bit rate of data traversing between the user device and the eNodeB based on the at least one buffer status report from at least one of the following: a media access control (MAC) layer of the eNodeB, a packet data convergence protocol (PDCP) layer of the eNodeB, and a radio link control (RLC) layer of the eNodeB, and
an ability of the user device to receive data packets having a predetermined size;
wherein an evolved node (eNodeB) base station performs at least one of the establishing, the transmitting, the determining, and the providing, the eNodeB base station comprising the at least one processor and the at least one memory.

17. The method according to claim 16, further comprising storing, using the at least one memory, data packets received from the server, the stored data packets include at least one transmission control protocol (TCP) data packet.

18. The method according to claim 17, further comprising transmitting, using the at least one processor, at least one data packet stored in the at least one memory from the base station to the user device.

19. The method according to claim 18, further comprising re-transmitting, using the at least one processor, at least one data packet stored in the at least one memory from the base station to the user device.

20. The method according to claim 19, further comprising receiving, using the at least one processor, at least one acknowledgement from the user device indicating that the at least one data packet is received by the user device.

21. The method according to claim 20, further comprising receiving, using the at least one processor, at least one duplicate acknowledgement from the user device indicating that the at least one data packet is received by the user device; and
re-transmitting, after receiving a predetermined number of duplicate acknowledgements from the user device, using the at least one processor, the at least one data packet stored in the at least one memory to the user device.

22. The method according to claim 19, further comprising receiving, using the at least one processor, at least one non-acknowledgement from the lower layer of the eNodeB indicating that the at least one data packet has not been received by the user device;
re-transmitting, after receiving the non-acknowledgement from the lower layer of the eNodeB, using the at least one processor, the at least one data packet stored in the at least one memory to the user device.

23. The method according to claim 22, wherein the non-acknowledgement being generated by at least one of the following: a packet data convergence protocol (PDCP) layer of the eNodeB, a media access control (MAC) layer of the eNodeB, and a radio link control (RLC) layer of the eNodeB.

24. The method according to claim 19, further comprising determining, using the at least one processor, a round trip time information for the at least one data packet, the round trip time information includes time taken by a transmission of the at least one data packet to the user device and a transmission of an acknowledgement by the user device indicative of the receipt of the data packet;
re-transmitting, based on the determined round trip time, using the at least one processor, the at least one data packet stored in the at least one memory to the user device.

25. The method according to claim 19, further comprising re-transmitting, using the at least one processor, the at least one data packet stored in the at least one memory to the user device using high priority indication.

26. The method according to claim 19, wherein the at least one processor being configured to prevent re-transmission of the data packet from the server to the user device upon the server failing to receive an acknowledgement from the user device within a predetermined period of time.

27. The method according to claim 26, wherein the at least one processor being configured to send to the server the acknowledgement indicating receipt of the data packet by the user device upon the at least one processor
sending a hybrid automatic repeat request (HARQ) data packet to the user device; and
receiving, in response to the sending, a confirmation from the user device that the data packet was received by the user device.

28. The method according to claim 26, wherein the at least one processor being configured to send to the server an acknowledgement indicating a receipt of the data packet by the user device upon receiving a confirmation that the data packet was received by the user device, the confirmation being generated by at least one of the following: a media access control (MAC) layer of the eNodeB, a packet data convergence protocol (PDCP) layer of the eNodeB, and a radio link control (RLC) layer of the eNodeB.

29. The method according to claim 16, wherein the at least one processor being configured to schedule transmission of the data packet from the server to the user device using the transmission control protocol.

30. The method according to claim 29, the at least one processor being configured to perform congestion avoidance on the communication link during transmission of the data packet using transmission control protocol.

31. A computer program product, for transmission of data packets between a user device and a server, comprising a non-transitory machine-readable medium storing instructions that, when executed by at least one programmable processor, cause the at least one programmable processor to perform operations comprising:
establishing a communication link between the user device and the server in accordance with a transmission control protocol for transmission of a data packet between the user device and the server; and
transmitting the at least one data packet utilizing the transmission control protocol, the at least one data packet being stored in the at least one memory based on at least one buffer occupancy threshold determined based on a priority of the at least one data packet;
determining a total size of data packets that can be received by the base station; and
providing an indication of the determined total size to the server;
wherein the total size of data packets is determined based on at least one of the following:
a storage threshold of the at least one memory,
a current capacity of the at least one memory based on existing data stored in the at least one memory,
a strength of a radio signal existing between the user device and the eNodeB base station,
a quality of a radio signal existing between the user device and the eNodeB base station,
an estimated bit rate of data traversing between the user device and the eNodeB based on the at least one buffer status report from at least one of the following: a media access control (MAC) layer of the eNodeB, a packet data convergence protocol (PDCP) layer of the eNodeB, and a radio link control (RLC) layer of the eNodeB, and
an ability of the user device to receive data packets having a predetermined size;
wherein using an evolved node (eNodeB) base station performing the establishing, the transmitting, the determining, and the providing, the eNodeB base station comprising the at least one processor and the at least one memory.

32. The computer program product according to claim 31, the operations further comprise
storing, using the at least one memory, data packets received from the server, the stored data packets include at least one transmission control protocol (TCP) data packet.

33. The computer program product according to claim 32, the operations further comprise
transmitting, using the at least one processor, at least one data packet stored in the at least one memory from the base station to the user device.

34. The computer program product according to claim 33, the operations further comprise
   re-transmitting, using the at least one processor, at least one data packet stored in the at least one memory from the base station to the user device.

35. The computer program product according to claim 34, the operations further comprise
   receiving, using the at least one processor, at least one acknowledgement from the user device indicating that the at least one data packet is received by the user device.

36. The computer program product according to claim 35, the operations further comprise
   receiving, using the at least one processor, at least one duplicate acknowledgement from the user device indicating that the at least one data packet is received by the user device; and
   re-transmitting, after receiving a predetermined number of duplicate acknowledgements from the user device, using the at least one processor, the at least one data packet stored in the at least one memory to the user device.

37. The computer program product according to claim 34, the operations further comprise
   receiving, using the at least one processor receives, at least one non-acknowledgement from the lower layer of the eNodeB indicating that the at least one data packet has not been received by the user device;
   re-transmitting, after receiving the non-acknowledgement from the lower layer of the eNodeB, using the at least one processor, the at least one data packet stored in the at least one memory to the user device.

38. The computer program product according to claim 37, wherein the non-acknowledgement being generated by at least one of the following: a packet data convergence protocol (PDCP) layer of the eNodeB, a media access control (MAC) layer of the eNodeB, and a radio link control (RLC) layer of the eNodeB.

39. The computer program product according to claim 34, the operations further comprise
   determining, using the at least one processor, a round trip time information for the at least one data packet, the round trip time information includes time taken by a transmission of the at least one data packet to the user device and a transmission of an acknowledgement by the user device indicative of the receipt of the data packet;
   re-transmitting, based on the determined round trip time, using the at least one processor, the at least one data packet stored in the at least one memory to the user device.

40. The computer program product according to claim 34, the operations further comprise
   re-transmitting, using the at least one processor, the at least one data packet stored in the at least one memory to the user device using high priority indication.

41. The computer program product according to claim 34, wherein the at least one processor being configured to prevent re-transmission of the data packet from the server to the user device upon the server failing to receive an acknowledgement from the user device within a predetermined period of time.

42. The computer program product according to claim 41, wherein the at least one processor being configured to send to the server the acknowledgement indicating receipt of the data packet by the user device upon the at least one processor
   sending a hybrid automatic repeat request (HARQ) data packet to the user device; and
   receiving, in response to the sending, a confirmation from the user device that the data packet was received by the user device.

43. The computer program product according to claim 41, wherein the at least one processor being configured to send to the server an acknowledgement indicating a receipt of the data packet by the user device upon receiving a confirmation that the data packet was received by the user device, the confirmation being generated by at least one of the following: a media access control (MAC) layer of the eNodeB, a packet data convergence protocol (PDCP) layer of the eNodeB, and a radio link control (RLC) layer of the eNodeB.

44. The computer program product according to claim 31, wherein the at least one processor being configured to schedule transmission of the data packet from the server to the user device using the transmission control protocol.

45. The computer program product according to claim 44, the at least one processor being configured to perform congestion avoidance on the communication link during transmission of the data packet using transmission control protocol.

* * * * *